(12) United States Patent
Konowalczyk

(10) Patent No.: US 12,276,463 B2
(45) Date of Patent: Apr. 15, 2025

(54) METHODS AND SYSTEMS AND APPARATUS TO SUPPORT REDUCED ENERGY AND WATER USAGE

(71) Applicant: OCTOPUS ENERGY HEATING LIMITED, London (GB)

(72) Inventor: Peter Konowalczyk, London (GB)

(*) Notice: Subject to any disclaimer, the term of this patent is extended or adjusted under 35 U.S.C. 154(b) by 0 days.

(21) Appl. No.: 18/264,389

(22) PCT Filed: Feb. 7, 2022

(86) PCT No.: PCT/IB2022/051049
§ 371 (c)(1),
(2) Date: Aug. 4, 2023

(87) PCT Pub. No.: WO2022/168022
PCT Pub. Date: Aug. 11, 2022

(65) Prior Publication Data
US 2024/0044520 A1    Feb. 8, 2024

(30) Foreign Application Priority Data

Feb. 7, 2021 (GB) .................................. 2101678
Jul. 2, 2021 (GB) .................................. 2109593
(Continued)

(51) Int. Cl.
*F24D 17/02* (2006.01)
*F24D 11/00* (2022.01)
(Continued)

(52) U.S. Cl.
CPC ........ *F28D 20/0034* (2013.01); *F24D 11/003* (2013.01); *F24D 11/02* (2013.01);
(Continued)

(58) Field of Classification Search
CPC .. F24D 17/02; F24D 19/1054; F24D 2200/08; F24D 2200/12; F24D 2220/044; F24D 17/0089; F24H 1/10; F24H 15/238
See application file for complete search history.

(56) References Cited

U.S. PATENT DOCUMENTS 4,798,059 A    1/1989 Morita
9,951,962 B2    4/2018 Tamaki et al.
(Continued)

FOREIGN PATENT DOCUMENTS

AT    504285 A1    4/2008
CN    201191144 Y    2/2009
(Continued)

OTHER PUBLICATIONS

English translation of EP-3617601-A1, dated Aug. 8, 2024 (Year: 2024).*
(Continued)

*Primary Examiner* — Edelmira Bosques
*Assistant Examiner* — Brett Peterson Mallon
(74) *Attorney, Agent, or Firm* — Perkins Coie LLP

(57) ABSTRACT

An installation includes an in-building hot water supply system, a hot water heat pump, an energy storage arrangement containing a mass of phase change material and a heat exchanger coupled between the hot water system and the heat pump, and a processor to provide a signal to the heat pump based on the opening of an outlet of the hot water supply system. The mass of phase change material has enough latent heat capacity to heat to a predetermined temperature a predetermined quantity of water in the interval from the opening of an outlet of the hot water supply system until at least the heat pump begins to heat water in the hot water supply system. Also provided is a method of controlling a heat pump in such an installation.

10 Claims, 10 Drawing Sheets

(30) Foreign Application Priority Data

| | | | |
|---|---|---|---|
| Jul. 2, 2021 | (GB) | ................................... | 2109594 |
| Jul. 2, 2021 | (GB) | ................................... | 2109596 |
| Jul. 2, 2021 | (GB) | ................................... | 2109597 |
| Jul. 2, 2021 | (GB) | ................................... | 2109598 |
| Jul. 2, 2021 | (GB) | ................................... | 2109599 |
| Jul. 2, 2021 | (GB) | ................................... | 2109600 |

(51) Int. Cl.
```
    F24D 11/02       (2006.01)
    F24D 19/10       (2006.01)
    F24H 15/212      (2022.01)
    F24H 15/238      (2022.01)
    F24H 15/31       (2022.01)
    F28D 20/00       (2006.01)
    F28D 20/02       (2006.01)
    G05D 7/06        (2006.01)
```
(52) U.S. Cl.
CPC .......... *F24D 17/02* (2013.01); *F24D 19/1054* (2013.01); *F24H 15/212* (2022.01); *F24H 15/238* (2022.01); *F24H 15/31* (2022.01); *F28D 20/021* (2013.01); *G05D 7/0682* (2013.01); *F24D 2200/08* (2013.01); *F24D 2200/12* (2013.01); *F24D 2200/14* (2013.01); *F24D 2220/042* (2013.01); *F24D 2220/044* (2013.01); *F24D 2220/10* (2013.01); *F28D 2020/0078* (2013.01); *F28D 2020/0082* (2013.01)

(56) References Cited

U.S. PATENT DOCUMENTS

| | | | |
|---|---|---|---|
| 2011/0271953 A1 | 11/2011 | Wortmann et al. | |
| 2016/0178234 A1* | 6/2016 | Hayden | F24H 1/103 |
| | | | 392/486 |
| 2018/0038616 A1 | 2/2018 | Scheers et al. | |
| 2018/0245801 A1 | 8/2018 | Schindler et al. | |
| 2020/0200399 A1* | 6/2020 | Daniels | F24D 17/0026 |
| 2020/0393324 A1 | 12/2020 | Rudd et al. | |
| 2021/0318027 A1 | 10/2021 | Boros et al. | |

FOREIGN PATENT DOCUMENTS

| | | | | |
|---|---|---|---|---|
| CN | 201265954 Y | | 7/2009 | |
| CN | 201488281 U | | 5/2010 | |
| CN | 103975204 A | | 8/2014 | |
| CN | 203758014 U | | 8/2014 | |
| CN | 110131889 A | | 8/2019 | |
| CN | 111189348 A | | 5/2020 | |
| CN | 111197864 A | * | 5/2020 | |
| CN | 111380258 A | | 7/2020 | |
| CN | 111750528 A | | 10/2020 | |
| CN | 111811142 A | | 10/2020 | |
| DE | 29921889 U1 | | 6/2000 | |
| DE | 10006564 A1 | | 8/2000 | |
| DE | 10151253 C1 | | 11/2002 | |
| DE | 102008043030 A1 | | 4/2010 | |
| DE | 102014225693 A1 | * | 6/2016 | ......... F24D 17/0031 |
| DE | 102018001313 A1 | * | 8/2019 | ......... F24D 19/1051 |
| EP | 0007538 A1 | | 2/1980 | |
| EP | 0321522 A1 | | 6/1989 | |
| EP | 1684035 A2 | | 7/2006 | |
| EP | 3121522 A1 | * | 1/2017 | ......... F24D 11/0214 |
| EP | 3617601 A1 | * | 3/2020 | ......... F24D 17/0073 |
| JP | S5795534 A | | 6/1982 | |
| JP | S5812992 A | | 1/1983 | |
| JP | H01256792 A | | 10/1989 | |
| JP | H02197761 A | | 8/1990 | |
| JP | H0526514 A | | 2/1993 | |
| JP | H1144495 A | | 2/1999 | |
| JP | 2000088348 A | | 3/2000 | |
| JP | 2004101031 A | | 4/2004 | |
| JP | 2004301469 A | | 10/2004 | |
| JP | 2012002469 A | | 1/2012 | |
| JP | 2019113278 A | * | 7/2019 | |
| KR | 20100030141 A | | 3/2010 | |
| WO | 2020209979 A2 | | 10/2020 | |
| WO | 2022168022 A1 | | 8/2022 | |

OTHER PUBLICATIONS

English translation of JP-2019113278-A, dated Aug. 8, 2024 (Year: 2024).*
English translation of CN-111197864-A, dated Aug. 8, 2024 (Year: 2024).*
English translation of DE-102014225693-A1, dated Aug. 8, 2024 (Year: 2024).*
English translation of DE-102018001313-A1, dated Aug. 8, 2024 (Year: 2024).*
Office Action for Japanese Application No. 2023-547559; Date of Mailing: Mar. 12, 2024; 5 pages.
Search Report for Chinese Application No. 2022800234488; Date of Mailing: Jan. 31, 2024; 3 pages.
International Search Report and Written Opinion of International Application No. PCT/IB2022/051049; Date of Mailing: May 19, 2022; 10 pages.
Examination Report for UK Application No. GB2109599.7, dated Feb. 14, 2022, 2 pages.
Search Report for U.K. Application No. GB2109594.8, dated Aug. 12, 2021; 1 page.
Search Report for UK Application No. GB2109593.0; dated Aug. 20, 2021, 1 page.
Search Report for UK Application No. GB2109596.3, dated Aug. 10, 2021, 1 page.
Search Report for UK Application No. GB2109597.1, dated Aug. 10, 2021, 1 page.
Search Report for UK Application No. GB2109598.9, dated Aug. 10, 2021, 1 page.
Search Report for UK Application No. GB2109599.7, dated Aug. 10, 2021, 1 page.
Search Report for UK Application No. GB2109600.3, dated Aug. 20, 2021, 1 page.

* cited by examiner

E.G. PCM DENSITY
    LIQUID  0.82 g/ml
    SOLID   0.90 g/ml

METHODS AND SYSTEMS AND APPARATUS TO SUPPORT REDUCED ENERGY AND WATER USAGE

TECHNICAL FIELD

The present disclosure variously relates to methods, systems and apparatus for installations including an in-building hot water supply system including an energy storage arrangement based on phase change materials.

BACKGROUND—GENERAL

According to Directive 2012/27/EU buildings represent 40% of the final energy consumption and 36% of the $CO_2$ emissions of the European Union. The EU Commission report of 2016 "Mapping and analyses of the current and future (2020-2030) heating/cooling fuel deployment (fossil/renewables)" concluded that in EU households, heating and hot water alone account for 79% of total final energy use (192.5 Mtoe). The EU Commission also report that, "according to 2019 figures from Eurostat, approximately 75% of heating and cooling is still generated from fossil fuels while only 22% is generated from renewable energy". To fulfil the EU's climate and energy goals, the heating and cooling sector must sharply reduce its energy consumption and cut its use of fossil fuels. Heat pumps (with energy drawn from the air, the ground or water) have been identified as potentially significant contributors in addressing this problem.

In many countries, there are policies and pressures to reduce carbon footprint. For example, in the UK in 2020 the UK Government published a whitepaper on a Future Homes Standard, with proposals to reduce carbon emissions from new homes by 75 to 80% compared to existing levels by 2025. In addition, it was announced in early 2019 that there would be a ban on the fitment of gas boilers to new homes from 2025. It is reported that in the UK at the time of filing 78% of the total energy used for the heating of buildings comes from gas, while 12% comes from electricity.

The UK has a large number of small, 2-3 bedroom or less, properties with gas-fired central heating, and most of these properties use what are known as combination boilers, in which the boiler acts as an instantaneous hot water heater, and as a boiler for central heating. Combination boilers are popular because they combine a small form factor, provide a more or less immediate source of "unlimited" hot water (with 20 to 35 kW output), and do not require hot water storage. Such boilers can be purchased from reputable manufactures relatively inexpensively. The small form factor and the ability to do without a hot water storage tank mean that it is generally possible to accommodate such a boiler even in a small flat or house—often wall-mounted in the kitchen, and to install a new boiler with one man day's work. It is therefore possible to get a new combi gas boiler installed inexpensively. With the imminent ban on new gas boilers, alternative heat sources will need to be provided in place of gas combi boilers. In addition, previously fitted combi boilers will eventually need to be replaced with some alternative.

Although heat pumps have been proposed as a potential solution to the need to reduce reliance on fossil fuels and cut CO2 emissions, they are currently unsuited to the problem of replacing gas fired boilers in smaller domestic (and small commercial) premises or a number of technical, commercial and practical reasons. They are typically very large and need a substantial unit on the outside of the property. Thus, they cannot easily be retro-fitted into a property with a typical combi boiler. A unit capable of providing equivalent output to a typical gas boiler would currently be expensive and may require significant electrical demand. Not only do the units themselves cost multiples of the equivalent gas fired equivalent, but also their size and complexity mean that installation is technically complex and therefore expensive. A storage tank for hot water is also required, and this is a further factor militating against the use of heat pumps in small domestic dwellings. A further technical problem is that heat pumps tend to require a significant time to start producing heat in response to demand, perhaps 30 seconds for self-checking then some time to heat up—so a delay of 1 minute or more between asking for hot water and its delivery. For this reason, attempted renewable solutions using heat pumps and/or solar are typically applicable to large properties with room for a hot water storage tank (with space demands, heat loss and *legionella* risk).

There therefore exists a need to provide a solution to the problem of finding a suitable technology to replace gas combi boilers, particularly for smaller domestic dwellings.

SUMMARY

In a first aspect there is provided an installation including an in-building hot water supply system, a heat pump arranged to heat water in the hot water supply system, an energy storage arrangement containing a mass of phase change material and a heat exchanger that is coupled between the hot water system and the heat pump, and a processor (system controller) to provide a signal to the heat pump based on the opening of an outlet of the hot water supply system; wherein the mass of phase change material has enough latent heat capacity to heat to a predetermined temperature a predetermined quantity of water in the interval from the opening of an outlet of the hot water supply system until at least the heat pump begins to heat water in the hot water supply system. Such an installation provides a convenient way to enjoy the benefits of an externally mounted heat pump in place of a conventional heat source, for example a gas combi boiler, to satisfy demand for instantaneous hot water.

Preferably the installation is configured to use the PCM energy storage arrangement as a priority source of energy to produce hot water. Such an arrangement can avoid the need to start the heat pump for short term demands for hot water, while avoiding the need to use some supplementary source of "instant" water heating (such as an electrically heated element or a gas-fired boiler).

In a second aspect there is provided an installation including an in building hot water system, the installation comprising a heat exchanger in a flow path to the outlet of the hot water system; an energy storage arrangement and a flow sensor in the flow path to the outlet of the hot water system, the heat exchanger being part of the energy storage arrangement; a heat pump connected to the heat exchanger to transfer heat from the heat pump to water in the hot water system; and a processor coupled to the flow sensor and the heat pump; wherein the processor is configured to provide a start signal to the heat pump based upon signals received from the flow sensor, the installation being so arranged that a time interval occurs between providing a start signal to the heat pump and the heating of water in the hot water system by the heat pump, the energy storage arrangement containing a mass of phase change material having a latent heat capacity sufficient to heat a predetermined quantity of water in the hot water system to a target temperature at least until water in the hot water system is heated by the heat pump, so that hot water can be supplied from the controllable outlet in the interval between the sending of the start signal and heating by the heat pump of water in the hot water system. Such an installation provides a convenient way to enjoy the benefits of an externally mounted heat pump in place of a conventional heat source, for example a gas combi boiler, to satisfy demand for instantaneous hot water. The energy storage arrangement of such an installation is able to supply hot water in the interval before a heat pump can come online, and avoids the need for hot water storage as part of the hot water supply installation—something that is of great practical significance if one is to be able to replace gas combi boilers in modestly sized homes. Preferably the phase change material is incorporated into the heat exchanger. This can improve energy efficiency and may reduce both the component count and the volume of the equipment that needs to be incorporated in the installation.

Preferably any of the foregoing installations further comprises an instantaneous water heater in the flow path to the outlet of the hot water system (either in parallel with or downstream of the energy storage arrangement), the instantaneous water heater being controlled by the processor. The instantaneous water heater is preferably an electric heater. Such an additional heat source can be useful for periods when the heat pump is unavailable, or when the energy storage arrangement is in a low charge state. It also provides a means to take advantage of low or negative energy tariffs or of locally generated electricity (e.g. from a domestic PV installation or a domestic wind turbine).

Optionally any of the foregoing installations may further include a temperature transducer in a flow path for water in the hot water system intermediate the heat exchanger and the instantaneous water heater. In this way, the system controller can determine whether how water leaving the heat exchanger would benefit from additional heating—for example, based on knowledge of the tap/outlet from which hot water is being supplied, combined with knowledge of predetermined temperature levels for hot water supplied to showers, handbasins, baths, kitchen sinks, etc. each of which may have a different predetermined supply temperature.

In a third aspect there is provided an installation including an in-building hot water supply system, a heat pump arranged to heat water in the hot water supply system, an energy storage arrangement containing a mass of phase change material having enough latent heat capacity to heat to a predetermined temperature a predetermined quantity of water in the interval from the opening of an outlet of the hot water supply system until at least the heat pump begins to heat water in the hot water supply system; a heat exchanger that is coupled between the hot water system and the heat pump; a processor to provide a signal to the heat pump based on the opening of an outlet of the hot water supply system; and an instantaneous water heater in the flow path to the outlet of the hot water system, the instantaneous water heater being controlled by the processor which is configured to control the instantaneous water heater based on information about the status of the phase-change material and of the heat pump. Optionally, the heat exchanger is in a flow path between a cold water supply and a controllable outlet of the hot water system, the installation-further comprising a flow sensor in the flow path between the cold water supply and the outlet of the hot water system coupled to the processor, the heat exchanger being part of the energy storage arrangement; wherein the processor is configured to provide the signal to the heat pump based upon a signal received from the flow sensor.

Optionally in any of the foregoing installations the processor may be configured to activate the instantaneous water heater only when the energy storage arrangement and the heat pump are unable to provide sufficient hot water. In this way, "green" energy supplied from the heat pump may be used preferentially compared to electricity supplied from the mains (for example) which may have been obtained by burning fossil fuels.

The processor may be configured to control the instantaneous water heater, based on information about the status of the phase-change material and of the heat pump. For example, if the PCM is depleted and the heat pump unavailable (for example because it has been started too many times in a given period or was too recently run), the instantaneous water heater may be used to compensate for the lack of availability of energy from the PCM and the heat pump. Whereas if the PCM is fully "charged" and/or the heat pump is available, the processor may decide not to use the instantaneous water heater.

The processor may be provided with logic to manage the use of the instantaneous water heater, the heat pump, and energy from the phase change material to reduce energy consumption. This may reduce the cost of heating water, and may also favour "green" energy over energy derived from fossil fuels. If the processor adopts a more cost-based approach, the processor is preferably provided with up-to-date tariff information. The processor may also have access to information on household activity (past, present, and planned), occupancy information, weather forecasts and/or current weather conditions, etc.

The processor may be processor configured to rely preferentially on the energy storage arrangement and then the heat pump to provide sufficient hot water. Such an approach can improve efficiency and reduce wear and tear on the heat pump and its components.

The enclosure of the energy storage arrangement may be a generally rectangular cuboid defined by a first side having a length between 300 mm and 600 mm, a second side having a length between 300 mm and 600 mm, and a third side having a length between 150 mm and 350 mm. By making the enclosure in this size range it should be possible to create a device which is a direct physical replacement for a previously installed combi gas boiler, as well as providing a unit suitable for installation in lieu of gas combi boilers in new installations.

The enclosure of the energy storage arrangement may be contained within a thermally insulating jacket. Although the energy storage material within the energy storage arrangement is generally likely to be kept at between 40 and 60 Celsius, overall energy efficiency will be improved by the provision of a suitable thermally insulated jacket or outer enclosure.

The energy storage arrangement may further comprise an electrical heater within the enclosure. This provides the ability to "charge" the PCM even when the heat pump is unavailable, as well as enabling the use of "cheap" electricity, taking advantage for example of temporary low supply tariffs, or perhaps generated from a domestic photovoltaic or wind generation installation.

The mass of phase-change material may have an energy storage capacity, based on the latent heat of the phase change material, of between 2 and 5 MJoules. An energy storage capacity in this range should be suitable for providing sufficient instantaneous hot water in applications where the energy storage arrangement is used to enable a heat pump to be used in place of a domestic gas combi boiler.

The processor may be configured to estimate an energy content of the phase change material.

The phase-change material may have a phase transformation at a temperature of between 40 and 60 Celsius. PCMs with phase transitions in this temperature range are particularly suitable for directly heating domestic hot water, while being compatible with efficient operating temperatures for heat pumps.

The phase change material may be a paraffin selected from the list set out later in the application. Paraffin waxes offer good latent heat capacity, are of low chemical reactivity, with good stability and low toxicity.

Optionally the installation of any of the aspects of the invention may be configured such that the energy storage arrangement comprises an enclosure that includes a plurality of sealed bodies, the phase-change material being enclosed within the sealed bodies, the energy bank being configured to contain an energy transfer liquid to surround the plurality of sealed bodies within the enclosure.

Optionally an input-side circuit of the energy bank is defined by a conduit having an input and an output, the input and the output being connected by an imperforate conduit wall so that water introduced at the input is guided by the conduit wall to the outlet without mixing with the energy transfer liquid within the enclosure.

Optionally the energy transfer liquid is sealed within the enclosure.

Optionally the installation of any of the aspects of the invention may be configured such that an input-side circuit of the energy bank includes one or more input ports and one or more output ports communicating with the interior of the enclosure, the arrangement being such that a heat transfer liquid introduced into the interior of the enclosure via one or more of the input ports is configured to flow past and over the plurality of sealed bodies within the enclosure and to exit the enclosure via one or more of the output ports.

In a fourth aspect there is provided a method of controlling a heat pump in an installation, the installation including an in-building hot water supply system, a heat pump arranged to heat water in the hot water supply system, an energy storage arrangement containing a mass of phase change material, and a processor, to provide a signal to the heat pump based on the opening of an outlet of the hot water supply system, the processor being configured to receive information on the status of the energy storage arrangement and on the status of the heat pump; wherein the mass of phase change material has enough latent heat capacity to heat to a predetermined temperature a predetermined quantity of water from the opening of an outlet of the hot water supply system at least until the heat pump begins to heat water in the hot water supply system; the method comprising the processor sensing the opening of an outlet of the hot water supply system and, based on a sensed hot water flow rate, the status of the energy storage arrangement, the status of the heat pump, determining whether to provide a start signal to the heat pump.

In a fifth aspect there is provided a method of controlling a heat pump in an installation, the installation including an in building hot water system, the installation comprising a heat exchanger in a flow path between a cold water supply and a controllable outlet of the hot water system; a heat pump connected to the heat exchanger to transfer heat from the heat pump to water in the hot water system; an energy storage unit and a flow sensor in the flow path between the cold water supply and the outlet of the hot water system; a processor coupled to the flow sensor and the heat pump, the processor being configured to receive information on the status of the energy storage arrangement and on the status of the heat pump; wherein the processor is configured to provide a start signal to the heat pump based upon signals received from the flow sensor, the arrangement being such that a time interval occurs between providing a start signal to the heat pump and the heating of water in the hot water system by the heat pump, the energy storage unit containing a mass of phase change material having a latent heat capacity sufficient to heat a predetermined quantity of water in the hot water system to a target temperature at least until water in the hot water system is heated by the heat pump, so that hot water can be supplied from the controllable outlet in the interval between the sending of the start signal and heating by the heat pump of water in the hot water system; the method comprising the processor sensing the opening of an outlet of the hot water supply system and, based on a sensed hot water flow rate, the status of the energy storage arrangement, the status of the heat pump, determining whether to provide a start signal to the heat pump.

The method of the fourth or fifth aspect may further comprise the processor, based on the sensed hot water flow rate, determining a type of the outlet whose opening has been sensed, and using the determined type in determining whether to provide a start signal to the heat pump.

The method of the fourth or fifth aspect may further comprise the processor using predicted and/or scheduled demand data in determining whether to provide a start signal to the heat pump.

In the method of the fourth or fifth aspect, the in-building hot water supply system may further comprise an electrical water heater, coupled to the processor, to heat water in the hot water system downstream from the energy storage arrangement, the method further comprising the processor, in the event that it is determined not to provide a start signal to the heat pump, determining whether to energise the electrical water heater to heat water in the hot water system.

In a sixth aspect there is provided a processor and memory for use in controlling a heat pump in an installation, the installation including an in-building hot water supply system, a heat pump arranged to heat water in the hot water supply system, and an energy storage arrangement containing a mass of phase change material, the processor being configured for operative connection to the heat pump to provide a signal to the heat pump based on the opening of an outlet of the hot water supply system, the processor being configured to receive information on the status of the energy storage arrangement and on the status of the heat pump; and the memory, operatively coupled to the processor, storing instructions that cause the processor to perform a method of controlling the heat pump, in which method the processor: senses the opening of an outlet of the hot water supply system and, based on a sensed hot water flow rate, the status of the energy storage arrangement, the status of the heat pump, determines whether to provide a start signal to the heat pump.

BRIEF DESCRIPTION OF THE DRAWINGS

Embodiments of various aspects of the disclosure will now be described by way of example only, with reference to the accompanying drawings, in which.

DETAILED DESCRIPTION

Figure 1:
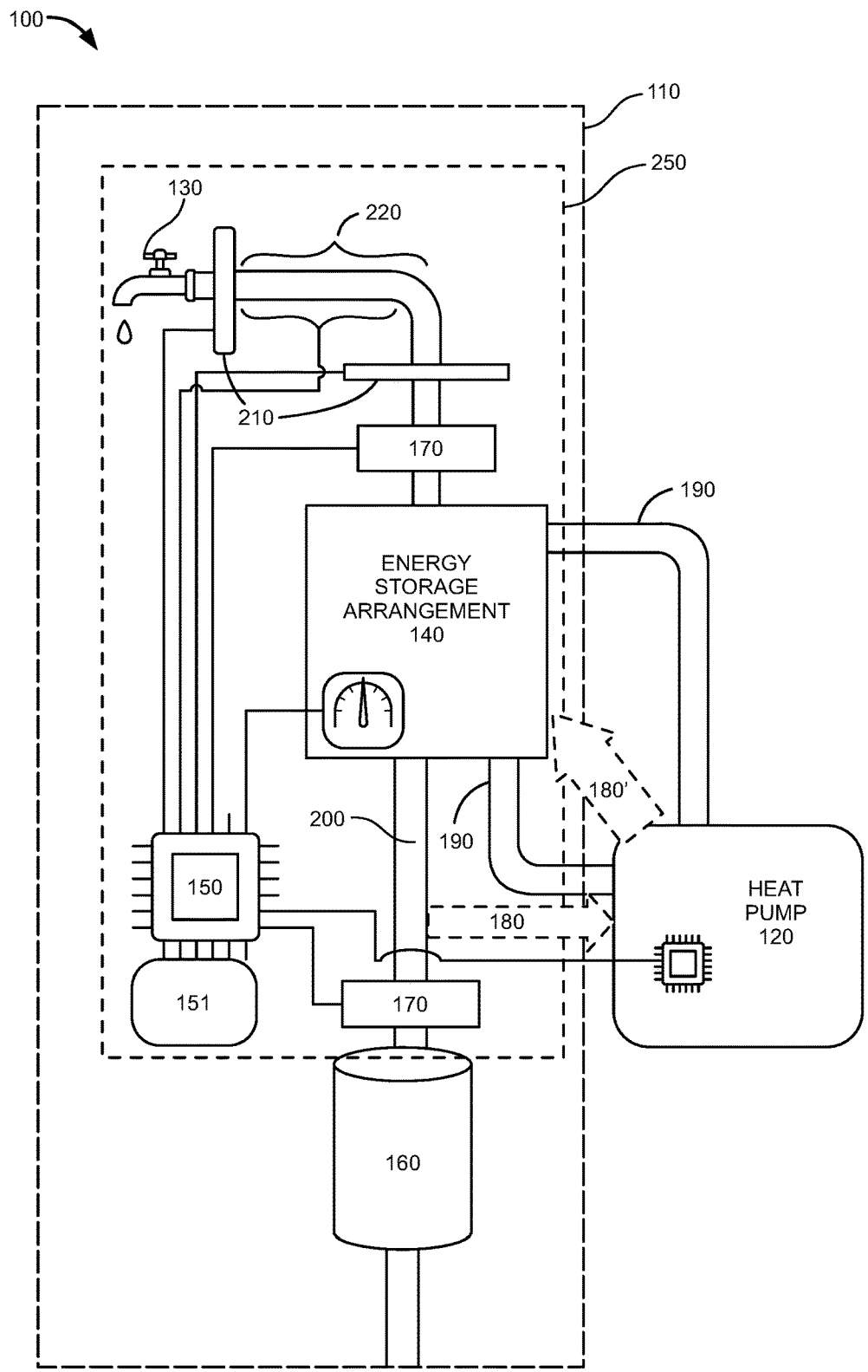
FIG. 1 is a schematic diagram showing a potential arrangement of an installation including an in-building hot water supply system according to an aspect of the disclosure.

FIG. 1 illustrates schematically an installation according to a first aspect of the disclosure. The installation 100 includes an in-building hot water supply system (HWSS), represented by the box 110, a heat pump 120 (which generally be located outside the building), is arranged to heat water in the HWSS 110. The HWSS includes at least one outlet 130 such as a tap or shower outlet. The HWSS further comprises an energy storage arrangement (ESA) 140 which contains a mass of phase change material (PCM). A processor 150, which may also be referred to as a system controller, is arranged to provide a signal to the heat pump 120 based on the opening of an outlet, such as outlet 130, of the hot water system.

The mass of phase change material has enough latent heat capacity to heat to a predetermined temperature a predetermined quantity of water in the interval from the opening of an outlet of the hot water supply system until at least the heat pump begins to heat water in the hot water supply system. Some examples of suitable phase change materials, and their properties, are discussed later in the specification.

The HWSS 110 is supplied with water to be heated, for example from a cold-water supply 160 at least one flow transducer 170 is included in the flow path between the supply of water to be heated and the at least one outlet 130. Preferably the heat pump is arranged to heat water in the HWSS by means of a closed-loop arrangement, indicated schematically by pipework 190, and the supply of water to be heated is connected directly to the HWSS as shown by pipework 200. The flow transducer 170 may be located on the supply side of the hot water system, or on the outlet side of the whole system. The HWSS is provided with at least one temperature transducer 210. If only a single temperature transducer 210 is provided, this should be in the flow path between the energy storage arrangement 140 and the at least one outlet 130.

The HWSS 110 also preferably includes an instantaneous water heater 220 either in the flow path between the energy storage arrangement 140 and the at least one outlet 130, as shown, or in parallel with the energy storage arrangement 140. When an instantaneous water heater 220 is included in the HWSS, it is preferable to include a temperature transducer in the flow path between the energy storage arrangement and the instantaneous water heater (if they are series connected), as well as one between the instantaneous water heater and the at least one outlet 130. The instantaneous water heater is preferably an electrical heater.

The processor 150 is coupled to the flow transducer 170, to memory 151, to each of the temperature transducers 210, and to the heat pump. In addition, one or more sensing arrangements in the ESA are preferably coupled to the processor, so that the processor is aware of the status of the ESA. If the instantaneous water heater 220 is included in the system, then the processor 150 is also connected to the instantaneous water heater 220.

With the preferred configuration in which the heat pump heats water in the HWSS by means of a closed loop arrangement, a heat exchanger, not shown, receives on one side liquid heated by the heat pump, and on another side water in the HWSS which is to be heated. Preferably, the heat exchanger forms part of the ESA. Preferably, the heat exchanger includes some or all of the mass of phase change material.

As shown in FIG. 1, by virtue of its size, the heat pump is typically located outside the building that houses the HWSS. The heat pump, whether it is mounted outside or within the building, will typically take 30 to 60 seconds to start to provide heat after having received a start signal. This is because an internal processor of the heat pump typically has to make checks on several components and subsystems, and also because of the inherent lag in the starting up of the compressor and the pump(s) of the heat pump, etc. Even after the start-up of the heat pump, there is of course an inevitable delay before heat from the heat pump reaches the HWSS. Likewise, some time is required for heat to be transferred, across any heat exchanger, between hot liquids supplied by the heat pump and water to be heated in the HWSS. Moreover, heat pumps are also typically configured to avoid starting more than 6 times per hour (it depends on manufacturer, but the figures are similar between manufacturers), and the processor 150 of the system will be aware of this constraint as it applies to the connected heat pump, and will also know about its own history of sending start instructions—and will factor this information into its decisions about the management of the various heat sources available to it.

The processor 150 of the HWSS is configured to provide a start signal to the heat pump based upon signals received from the flow sensor 170. As noted above, the installation is so configured that a time interval occurs between providing a start signal to the heat pump and the heating of water in the hot water system by the heat pump. This means that, absent a store of hot water or some other source of hot water, the turning on of a tap or shower fed by the HWSS will involve a long wait—of well over a minute, before hot water emerges from the outlet. This is both frustrating for users and a tremendous waste of water. The wait for hot water could be shortened by using an instantaneous water heater until such time as hot water arrives from the heat pump. But with such an arrangement, given that most instances of hot water usage from a tap (as opposed to from a shower) are less than 60 to 90 seconds, most of the hot water used would come from the instantaneous water heater (either electrically fed, or gas fed), so that the green energy benefits of providing heat pump would largely be lost.

The processor 150 can modulate the power output of the electric element 220, based on a value received from the temperature sensor 210 to achieve the correct target temperature at the water outlet 130.

The ESA is provided as a means to bridge the gap between demanding hot water (i.e., the opening of the tap or shower control) and delivery of hot water heated by the heat pump. The system is preferably configured so that the ESA is charged with energy from the heat pump. The processor 150, using temperature information from the temperature sensors (210) and flow information from the flow sensor(s) 170, is configured preferentially to use the ESA to heat water supplied through the outlet 130. In this way, the processor 150 minimises its use of the instantaneous water heater 220.

Hence the processor is configured to provide a start signal to the heat pump based upon signals received from the flow sensor, the installation being so arranged that a time interval occurs between providing a start signal to the heat pump and the heating of water in the hot water system by the heat pump, the energy storage arrangement containing a mass of phase change material having a latent heat capacity sufficient to heat a predetermined quantity of water in the hot water system to a target temperature at least until water in the hot water system is heated by the heat pump, so that hot water can be supplied from the controllable outlet in the interval between the sending of the start signal and heating by the heat pump of water in the hot water system. The target temperature may be set based on the preferences of the users of the system, but will typically be in the region of say 40 to 45 Celsius. The predetermined quantity may be based on a desired duration of water supply at a flow rate chosen based either on the normal flow rates used for the outlet of the HWSS having the highest flow rate, or a lower rate that is considered to be both adequate and acceptable. The system and processor are preferably configured to allow these two variables (temperature and quantity) to be adjusted within preset limits (the preset limit values possibly being adjusted on the installation of the system).

Information from the flow sensor(s) 170 can tell the processor 150 whether, for example, an outlet that has been opened is a shower outlet, or a wash basin outlet. If the processor 150 determines that a shower outlet has been opened, the processor 150 will send a start signal to the heat pump, because it is expected to be worthwhile firing up the heat pump for the several minutes that a shower typically takes. Conversely, if the flow rate information supplied to the processor 150 suggests that a wash basin tap has been opened, the processor will determine that no start signal will be sent to the heat pump, because the heat pump is unlikely to be able to provide hot water before the wash basin tap is turned off again.

The processor 150 may be associated with logic, and for example a machine learning algorithm, that enable the processor to learn the behaviour of the occupants of the premises served by the HWSS, enabling the creation of a database from which the processor 150 can reliably predict the quantities and durations of hot water demand/usage according to time of day, day of the week, water outlet used, et cetera. Such an approach can be enhanced by, for example, providing further flow sensors associated with different water outlets of the HWSS (some or all of them, and preferably at least enabling the ready distinction between outlets with brief hot water demands—such as cloakroom hand basins, and those with prolonged hot water demands, such as showers and kitchen sinks). Additionally, by providing one or more flow sensors in the cold-water supply, it may be possible to identify cold water usage corresponding to the flushing the toilet, for example, from which can be inferred the imminent demand for a brief supply of hot water for hand washing. The system processor 150 is preferably provided with logic to control all various heating assets (ESA(s), instantaneous water heater (s), and heat pump in the most effective, economic and efficient way.

It can be considered that the ESA 140, the heat exchanger, the processor 150, the instantaneous water heater 220 and the flow and temperature transducers, 170 and 210, together constitute an interface unit 250 which interfaces between heat pump 120 and an in building hot water system 110. FIG. 1 shows such an interface unit serving only to heat water for an in-building hot water system, but it will be appreciated that in many parts of the world there is a need for space heating within many buildings, and that it is attractive to use a heat pump for such space heating.

Typically, current combi boilers used even in small dwellings are large enough to provide 24 kW and more of hot water which is equivalent to shower or bath flow, but the typical space heating energy demand is much lower—typically around 4 kW. If one were to design a system in which both DHW and space heating were provided solely from a heat pump, one would need to specify a 24 kW heat pump to meet the DHW requirement, but such a system would be impractically large for typical 1-to-3 bedroom flats and houses, where for the most part the need is for space heating with only intermittent hot water usage.

Figure 2:
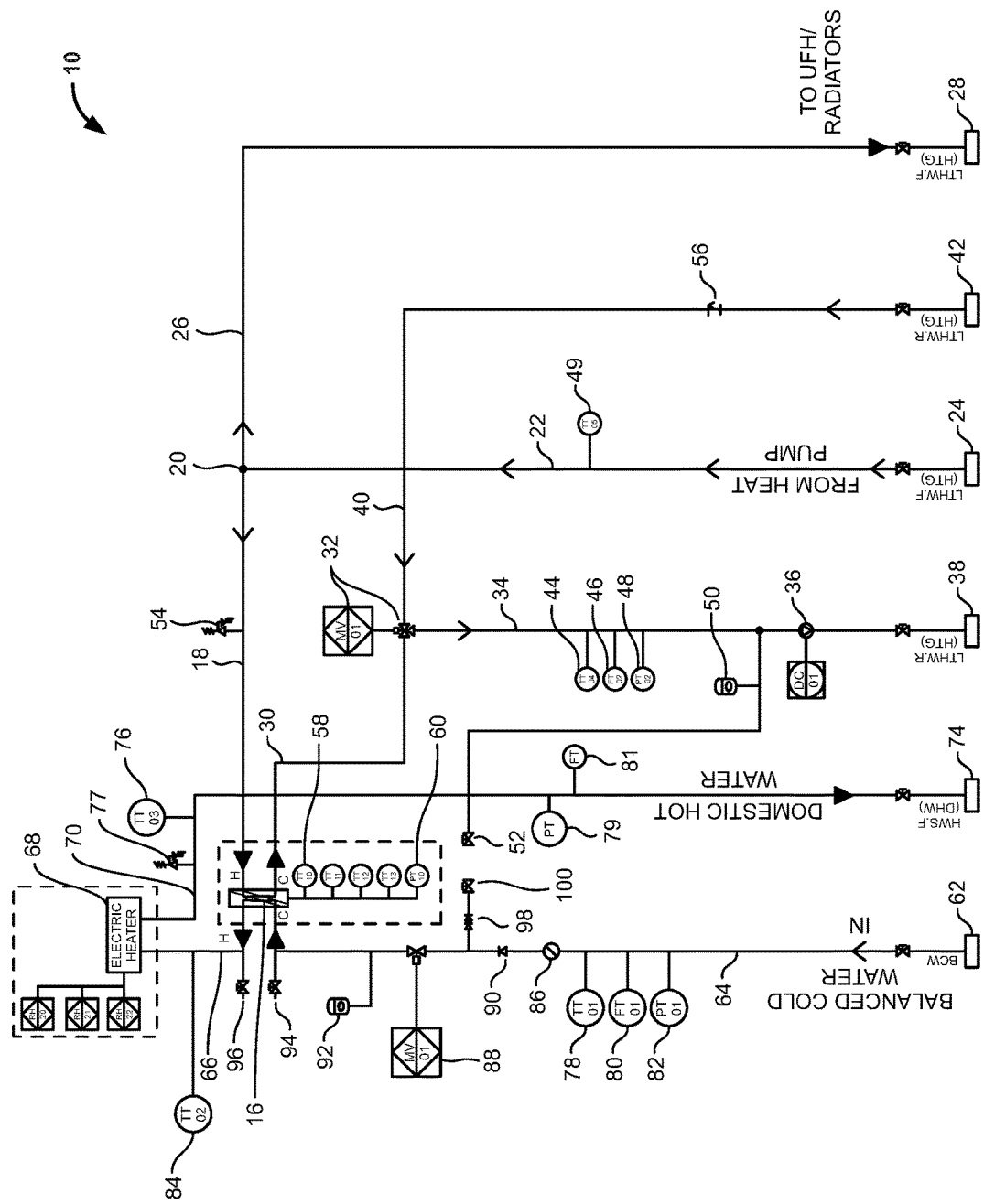
FIG. 2 is a schematic diagram showing a potential arrangement of components of an interface unit according to an aspect of the disclosure.

FIG. 2 shows schematically a potential arrangement of components of an interface unit 250 according to an aspect of the disclosure. The interface unit interfaces between a heat pump (not shown in this Figure) and an in-building hot water system. The interface unit includes a heat exchanger 12 comprising an enclosure (not separately numbered) within which is an input-side circuit, shown in very simplified form as 14, for connection to the heat pump, and an output-side circuit, again shown in very simplified form as 16, for connection to the in-building hot water system (not shown in this Figure). The heat exchanger 12 also contains a thermal storage medium for the storage of energy, but this is not shown in the Figure. In the example that will now be described with reference to FIG. 1 the thermal storage medium is a phase-change material. Throughout this specification, including the claims, references to thermal storage medium, energy storage medium and phase change material should be considered to be interchangeable unless the context clearly requires otherwise.

Typically, the phase-change material in the heat exchanger has an energy storage capacity (in terms of the amount of energy stored by virtue of the latent heat of fusion) of between 2 and 5 MJoules, although more energy storage is possible and can be useful. And of course, less energy storage is also possible, but in general one wants to maximise (subject to practical constraints based on physical dimensions, weight, cost and safety) the potential for energy storage in the phase-change material of the interface unit 10. More will be said about suitable phase-change materials and their properties, and also about dimensions etc. later in this specification.

The input side circuit 14 is connected to a pipe or conduit 18 which is in turn fed from node 20, from pipe 22 which has a coupling 24 for connection to a feed from a heat pump. Node 20 also feeds fluid from the heat pump to pipe 26 which terminates in a coupling 28 which is intended for connection to a heating network of a house or flat—for example for plumbing in to underfloor heating or a network of radiators or both. Thus, once the interface unit 10 is fully installed and operational, fluid heated by a heat pump (which is located outside the house or flat) passes through coupling 24 and along pipe 22 to node 20, from where, depending upon the setting of the 3-port valve 32, the fluid flow passes along pipe 18 to the input-side circuit 14 of the heat exchanger, or along pipe 26 and out through coupling 28 to the heating infrastructure of the house or flat.

Heated fluid from the heat pump flows through the input-side circuit 14 of the heat exchanger and out of the heat exchanger 12 along pipe 30. In use, under some circumstance, heat carried by the heated fluid from the heat pump gives up some of its energy to the phase change material inside the heat exchanger and some to water in the output-side circuit 16. Under other circumstances, as will be explained later, fluid flowing through the input-side circuit 14 of the heat exchanger actually acquires heat from the phase change material.

Pipe 30 feeds fluid that leaves the input-side circuit 14 to a motorized 3-port valve 32 and then, depending upon the status of the valve out along pipe 34 to pump 36. The pump 36 may serve to push the flow on to the external heat pump via coupling 38.

The motorized 3-port valve 32 also receives fluid from pipe 40 which receives, via coupling 42, fluid returning from the heating infrastructure (e.g., radiators) of the house or flat.

Between the motorized 3-port valve 32 and the pump 36 a trio of transducers are provided: a temperature transducer 44, a flow transducer 46, and a pressure transducer 48. In addition, a temperature transducer 49 is provided in the pipe 22 which brings in fluid from the output of the heat pump. These transducers, like all the others in the interface unit 10, are operatively connected to or addressable by a processor, not shown, which is typically provided as part of the interface unit—but which can be provided in a separate module.

Although not illustrated in FIG. 2, an additional electrical heating element may also be provided in the flow path between the coupler 24, which receives fluid from the output of the heat pump. This additional electrical heating element may again be an inductive or resistive heating element and is provided as a means to compensate for potential failure of the heat pump, but also for possible use in adding energy to the thermal storage unit (for example based on the current energy cost and predicted for heating and/or hot water. The additional electrical heating element is also of course controllable by the processor of the system.

Also coupled to pipe 34 is an expansion vessel 50, to which is connected a valve 52 by means of which a filling loop may be connected to top up fluid in the heating circuit. Also shown as part of the heating circuit of the interface unit are a pressure relief valve 54, intermediate the 3-port valve 32 and the input-side circuit 14, and a strainer 56 (to capture particulate contaminants) intermediate coupling 42 and the 3-port valve 32.

The heat exchanger 12 is also provided with several transducers, including at least one temperature transducer 58, although more (e.g. up to 4 or more) are preferable provided, as shown, and a pressure transducer 60. In the example shown, the heat exchanger includes 4 temperature transducers uniformly distributed within the phase change material so that temperature variations can be determined (and hence knowledge obtained about the state of the phase change material throughout its bulk). Such an arrangement may be of particular benefit during the design/implementation phase as a means to optimise design of the heat exchanger—including in optimising addition heat transfer arrangements. But such an arrangement may also continue to be of benefit in deployed systems as having multiple sensors can provide useful information to the processor and machine learning algorithms employed by the processor (either of just the interface unit, and/or of a processor of a system including the interface unit.

The arrangement of the cold-water feed and the hot water circuit of the interface unit 10 will now be described. A coupling 62 is provided for connection to a cold feed from a water main. Typically, before water from the water main reaches the interface unit 10, the water will have passed through an anti-syphon non-return valve and may have had its pressure reduced. From coupling 62 cold water passes along pipe to the output-side circuit 16 of the heat exchanger 12. Given that we provide a processor that is monitoring numerous sensors in the interface unit, the same processor can optionally be given one more task to do. That is to monitor the pressure at which cold water is delivered from the mains water supply. To this end, a further pressure sensor can be introduced in to the cold water supply line upstream of coupling 62, and in particular upstream of any pressure reducing arrangement within the premises. The processor can then continually or periodically monitor the supplied water pressure, and even prompt the owner/user to seek compensation from the water supply company if the water main supplies water at a pressure below the statutory minimum.

From the output-side circuit 16 water, which may have been heated by its passage through the heat exchanger, passes along a pipe 66 to an electrical heating unit 68. The electrical heating unit 68, which is under the control of the processor mentioned previously, may comprise a resistive or inductive heating arrangement whose heat output can be modulated in accordance with instructions from the processor.

The processor is configured to control the electrical heater, based on information about the status of the phase-change material and of the heat pump. Typically, the electrical heating unit 68 has a power rating of no more than 10 kW, although under some circumstances a more powerful heater, e.g., 12 kW, may be provided.

From the electric heater 68, what will by now hot water passes along a pipe 70 to a coupling 74 to which the hot water circuit, including controllable outlets such as taps and showers, of the house or flat will be connected.

A temperature transducer 76 is provided after the electric heater 68, for example at the outlet of the electric heater 68 to provide information on the water temperature at the outlet of the hot water system. A pressure relief valve 77 is also provided in the hot water supply, and while this is shown as being located between the electric heater 68 and the outlet temperature transducer 76, its precise location is unimportant—as indeed is the case for many of the components illustrated in FIG. 1.

It will be appreciated that the processor can call on the heat pump to start either based on demand for space heating (e.g., based on a stored program either in the processor or in an external controller, and/or based on signals from one or more thermostats—e.g.room stats, external stats, underfloor heating stats) or demand for hot water. Control of the heat pump may be in the form of simple on/off commands, but may also or alternatively be in the form of modulation (using, for example, a ModBus).

As is the case with the heating circuit of the interface unit, a trio of transducers are provided along the cold-water feed pipe 64: a temperature transducer 78, a flow transducer 80, and a pressure transducer 82. Another temperature transducer 84 is also provided in pipe 66 intermediate the outlet of the output-side circuit 16 of the heat exchanger 12 and the electric heater 68. These transducers are again all operatively connected to or addressable by the processor mentioned previously.

Also shown on the cold water supply line 64 are a magnetic or electrical water conditioner 86, a motorised and modulatable valve 88 (which like all the motorised valves may be controlled by the processor mentioned previously), a non-return valve 90, and an expansion vessel 92. The modulatable valve 88 can be controlled to regulate the flow of cold water to maintain a desired temperature of hot water (measured for example by temperature transducer 76).

Valves 94 and 96 are also provided for connection to external storage tanks for the storage of cold and heated water respectively. Optionally, at least the valve 96 may be used to recirculate hot water in the premises to reduce the hot water supply time, although this functionality might involve a higher energy usage—so that the functionality should be used with care. Finally, a double check valve 98 connects cold feed pipe 64 to another valve 100 which can be used with a filling loop to connect to previously mentioned valve 52 for charging the heating circuit with more water or a mix of water and corrosion inhibiter.

It should be noted that FIG. 2 shows various of the pipes crossing, but unless these crossing are shown as nodes, like node 20, the two pipes that are shown as cross do not communicate with each other, as should by now be clear from the foregoing description of the Figure.

Although not shown in FIG. 2, the heat exchanger 12 may include one or more additional electrical heating elements configured to put heat into the thermal storage medium. While this may seem counter intuitive, it permits the use of electrical energy to pre-charge the thermal storage medium at times when it makes economic sense to do so, as will now be explained.

It has long been the practice of energy supply companies to have tariffs where the cost of a unit of electricity varies according to the time of day, to take account of times of increased or reduced demand and to help shape customer behaviour to better balance demand to supply capacity. Historically, tariff plans were rather coarse reflecting the technology both of power generation and of consumption. But increasing incorporation of renewable energy sources of electrical power—such as solar power (e.g. from photovoltaic cells, panels, and farms) and wind power, into the power generation fabric of countries has spurred the development of a more dynamic pricing of energy. This approach reflects the variability inherent in such weather-dependent power generation. Initially such dynamic pricing was largely restricted to large scale users, increasingly dynamic pricing is being offered to domestic consumers.

The degree of dynamism of the pricing varies from country to country, and also between different producers within a given country. At one extreme, "dynamic" pricing is little more than the offering of different tariffs in different time windows over the day, and such tariffs may apply for weeks, months, or seasons without variation. But some dynamic pricing regimes enable the supplier to change prices with a day's notice or less—so for example, customers may be offered today prices for half-hour slots tomorrow. Time slots of as short as 6 minutes are offered in some countries, and conceivably the lead time for notifying consumers of forthcoming tariffs can be reduced further by including "intelligence" in energy-consuming equipment.

Because it is possible to use short and medium term weather predictions to predict both the amount of energy likely to be produced by solar and wind installations, and the likely scale of power demand for heating and cooling, it becomes possible to predict periods of extremes of demand. Some power generation companies with significant renewable generation capacity have even been known to offer negative charging for electricity—literally paying customers to use the excess power. More often, power may be offered at a small fraction of the usual rate.

By incorporating an electric heater into an energy storage unit, such as a heat exchanger of systems according to the disclosure, it becomes possible for consumers to take advantage of periods of low-cost supply and to reduce their reliance on electrical power at times of high energy prices. This not only benefits the individual consumer, but it is also beneficial more generally as it can reduce demand at times when excess demand must be met by burning fossil fuels.

The processor of the interface unit has a wired or wireless connection (or both) to a data network, such as the Internet, to enable the processor to receive dynamic pricing information from energy suppliers. The processor also preferably has a data link connection (e.g., a ModBus) to the heat pump, both to send instructions to the heat pump and to receive information (e.g. status information and temperature information) from the heat pump. The processor has logic which enables it* to learn the behaviour of the household, and with this and the dynamic pricing information, the processor is able to determine whether and when to use cheaper electricity to pre-charge the heating system. This may be by heating the energy storage medium using an electrical element inside the heat exchanger, but alternatively this can be by driving the heat pump to a higher-than-normal temperature—for example 60 Celsius rather than between 40 and 48 Celsius. The efficiency of the heat pump reduces when it operates at higher temperature, but this can be taken into account by the processor in deciding when and how best to use cheaper electricity.

*Because the system processor is connectable to a data network, such as the Internet and/or a provider's intranet, the local system processor can benefit from external computing power. So, for example the manufacturer of the interface unit is likely to have a cloud presence (or intranet) where computing power is provided for calculations of, for example, predicted:
occupancy; activity; tariff (short/long); weather forecasts (which may be preferable to generally available weather forecasts because they can be pre-processed for easy use by the local processor, and they may also be tailored very specifically to the situation, location, exposure of the property within which the interface unit is installed); identification of false positives and/or false negatives.

To protect users from the risk of scalding by overheated water from the hot water supply system it is sensible to provide a scalding protection feature. This may take the form of providing an electrically controllable (modulatable) valve to mix cold water from the cold water supply into hot water as it leaves the output circuit of the heat exchanger.

As one aspect of the disclosure, we propose to replace the combi gas boiler by the premanufactured set of heat exchangers, PCM energy bank, valves, pumps, and other hardware with the controller—all of them in the box which may match the shape and form of a gas combi boiler. Such an approach may lead to a significant decrease in the installation time and complexity of the plumbing work either to replace an existing gas combi boiler or for a new installation in place of a gas combi boiler.

FIG. 2 shows schematically what might be considered the "guts" of the interface unit, but does not show any container for these "guts". An important application of interface units according to the disclosure is as a means to enable a heat pump to be used as a practical contributor to the space heating and hot water requirements of a dwelling that was previously provide with a gas-fired combination boiler (or which might otherwise have such a boiler installed), it will be appreciated that it will often be convenient both to provide a container both for aesthetics and safety, just as is the case conventionally with combi boilers. Moreover, preferably any such container will be dimensioned to fit within a form factor enabling direct replacement of a combi boiler—which are typically wall mounted, often in a kitchen where they co-exist with kitchen cabinets. Based on the form of a generally rectangular cuboid (although of course, for aesthetics, ergonomics, or safety, curved surfaces may be used for any or all of the surfaces of the container) with a height, width and depth, suitable sizes may be found in the approximate ranges: height 650 mm to 800 mm; width 350 mm to 550 mm; depth 260 mm to 420 mm; for example, 800 mm high, by 500 mm wide, and 400 mm deep, although larger, and in particular taller, units may be provided for installation where these can be accommodated.

One notable distinction of interface units according to the disclosure with respect to gas combi boilers is that while the containers of the latter generally have to be made of non-combustible materials—such as steel, due to the presence of a hot combustion chamber, the internal temperatures of an interface unit will generally be considerably less than 100 Celsius, typically less than 70 Celsius, and often less than 60 Celsius. So, it becomes practical to use other, less fire-resistant materials such a wood, bamboo, or even paper, in fabricating a container for the interface unit.

The lack of combustion also opens up the possibility to install interface units in locations that would generally never be considered as suitable for the installation of gas combi boilers—and of course, unlike a gas combi boiler, interface units according to the disclosure, do not require a flue for exhaust gases. So, for example, it becomes possible to configure an interface unit for installation beneath a kitchen worktop, and even to make use of the notorious dead spot represented by an under counter corner. For installation in such a location the interface unit could actually be integrated into an under counter cupboard—preferably through a collaboration with a manufacturer of kitchen cabinets. But greatest flexibility for deployment would be retained by having an interface unit that effectively sits behind some form of cabinet, the cabinet being configured to allow access to the interface unit. The interface unit would then preferably be configured to permit the circulation pump 36 to be slid out and away from the heat exchanger 12 before the circulation pump 36 is decoupled from the flow path of the input-side circuit.

Consideration can also be given to taking advantage of other space frequently wasted in fitted kitchens, namely the space beneath under-counter cupboards. There is often more a space with a height of more than 150 mm, and a depth of around 600 mm, with widths of 300, 400, 500, 600 mm or more (although allowance needs to be made for any legs supporting the cabinets). For new installations in particular, or where a combi boiler is being replaced along with a kitchen refit, it makes sense to use these spaces at least to accommodate the heat exchanger of the interface unit—or to use more than one heat exchanger unit for a given interface unit.

Particularly for interface units designed for wall mounting, although potentially beneficial whatever the application of the interface unit, it will often be desirable to design the interface unit as a plurality of modules. With such designs it can be convenient to have the heat exchanger as one of the of modules, because the presence of the phase-change material can result in the heat exchanger alone weighing more than 25 kg. For reasons of health and safety, and in order to facilitate one-person installation, it would be desirable to ensure that an interface unit can be delivered as a set of modules none of which weighs more than about 25 kg.

Such a weight constraint can be supported by making one of the modules a chassis for mounting the interface unit to a structure. For example, where an interface unit is to be wall mounted in place of an existing gas combi boiler, it can be convenient if a chassis, by which the other modules are supported, can first be fixed to the wall. Preferably the chassis is designed to work with the positions of existing fixing points used to support the combi boiler that is being replaced. This could potentially be done by providing a "universal" chassis that has fixing holes preformed according to the spacings and positions of popular gas combi boilers. Alternatively, it could be cost effective to produce a range of chassis each having hole positions/sizes/spacings to match those of particular manufacturer's boilers. Then one just needs to specify the right chassis to replace the relevant manufacturer's boiler. There are multiple benefits to this approach: it avoids the need to drill more holes for plugs to take fixing bolts—and not only does this eliminate the time needed to mark out, drill the holes and clean up, but it avoids the need to further weaken the structure of the dwelling where installation is taking place—which can be an important consideration given the low cost construction techniques and materials frequently used in "starter homes" and other low cost housing.

Preferably the heat exchanger module and the chassis module are configured to couple together. In this way it may be possible to avoid the need for separable fastenings, again saving installation time.

Preferably an additional module includes first interconnects, e.g. 62 and 74, to couple the output side circuit 16 of the heat exchanger 12 to the in-building hot water system.

Preferably the additional module also includes second interconnects, e.g. 38 and 24, to couple the input side circuit 14 of the heat exchanger 12 to the heat pump. Preferably the additional module also includes third interconnects, e.g. 42 and 28, to couple the interface unit to the heat circuit of the premises where the interface unit is to be used. It will be appreciated that by mounting heat exchanger to the chassis which is itself directly connected to the wall, rather than first mounting the connections to the chassis, the weight of the heat exchanger is kept closer to the wall, reducing the cantilever loading effect on the wall fixings that secure the interface unit to the wall.

Phase Change Materials

One suitable class of phase change materials are paraffin waxes which have a solid-liquid phase change at temperatures of interest for domestic hot water supplies and for use in combination with heat pumps. Of particular interest are paraffin waxes that melt at temperatures in the range 40 to 60 Celsius, and within this range waxes can be found that melt at different temperatures to suit specific applications. Typical latent heat capacity is between about 180 kJ/kg and 230 kJ/kg and a specific heat of perhaps 2.27 $Jg^{-1}K^{-1}$ in the liquid phase, and 2.1 $Jg^{-1}K^{-1}$ in the solid phase. It can be seen that very considerable amounts of energy can be stored taking using the latent heat of fusion. More energy can also be stored by heating the phase change liquid above its melting point. For example, when electricity costs are relatively low and it can be predicted that there will shortly be a need for hot water (at a time when electricity is likely to, or known to be going to, cost more perhaps), then it can make sense to run the heat pump at a higher-than-normal temperature to "overheat" the thermal energy store.

A suitable choice of wax may be one with a melting point at around 48 Celsius, such as n-tricosane $C_{23}$, or paraffin $C_{20}$-$C_{33}$. Applying the standard 3K temperature difference across the heat exchanger (between the liquid supplied by the heat pump and the phase change material in the heat exchanger) gives a heat pump liquid temperature of around 51 Celsius. And similarly on the output side, allowing a 3K temperature drop, we arrive at a water temperature of 45 Celsius which is satisfactory for general domestic hot water—hot enough for kitchen taps, but potentially a little high for shower/bathroom taps—but obviously cold water can always be added to a flow to reduce water temperature. Of course, if the household are trained to accept lower hot water temperatures, or if they are acceptable for some other reason, then potentially a phase change material with a lower melting point may be considered, but generally a phase transition temperature in the range 45 to 50 is likely to be a good choice. Obviously, we will want to take into account the risk of *Legionella* from storing water at such a temperature.

Heat pumps (for example ground source or air source heat pumps) have operating temperatures of up to 60 Celsius (although by using propane as a refrigerant, operating temperatures of up to 72 Celsius are possible), but their efficiencies tend to be much higher when run at temperatures in the range of 45 to 50 Celsius. So, our 51 Celsius, from a phase transition temperature of 48 Celsius is likely to be satisfactory. Consideration also needs to be given to the temperature performance of the heat pump. Generally, the maximum DT (the difference between the input and output temperature of the fluid heated by the heat pump) is preferably kept in the range of 5 to 7 Celsius, although it can be as high as 10 Celsius.

Although paraffin waxes are a preferred material for use as the energy storage medium, they are not the only suitable materials. Salt hydrates are also suitable for latent heat energy storage systems such as the present ones. Salt hydrates in this context are mixtures of inorganic salts and water, with the phase change involving the loss of all or much of their water. At the phase transition, the hydrate crystals are divided into anhydrous (or less aqueous) salt and water. Advantages of salt hydrates are that they have much higher thermal conductivities than paraffin waxes (between 2 to 5 times higher), and a much smaller volume change with phase transition. A suitable salt hydrate for the current application is $Na_2S_2O_3 \cdot 5H_2O$, which has a melting point around 48 to 49 Celsius, and latent heat of 200/220 kJ/kg.

In terms simply of energy storage, consideration can also be given to using PCMs with phase transition temperatures that are significantly above the 40-50 Celsius range. For example, a paraffin wax, waxes being available with a wide range of melting points:

n-henicosane $C_{24}$ which has a melting point around 40 Celsius;
n-docosane $C_{21}$ which has a melting point around 44.5 Celsius;
n-tetracosane $C_{23}$ which has a melting point around 52 Celsius;
n-pentacosane $C_{23}$ which has a melting point around 54 Celsius;
n-hexacosane $C_{26}$ which has a melting point around 56.5 Celsius;
n-heptacosane $C_{27}$ which has a melting point around 59 Celsius;
n-octacosane $C_{28}$ which has a melting point around 64.5 Celsius;
n-nonacosane $C_{29}$ which has a melting point around 65 Celsius;
n-triacosane $C_{30}$ which has a melting point around 66 Celsius;
n-hentriacosane $C_{31}$ which has a melting point around 67 Celsius;
n-dotriacosane $C_{32}$ which has a melting point around 69 Celsius;
n-triatriacosane $C_{33}$ which has a melting point around 71 Celsius;
paraffin $C_{22}$-$C_{45}$ which has a melting point around 58 to 60 Celsius;
paraffin $C_{21}$-$C_{50}$ which has a melting point around 66 to 68 Celsius;
RT 70 HC which has a melting point around 69 to 71 Celsius.

Alternatively, a salt hydrate such as $CH_3COONa \cdot 3H_2O$—which has a melting point around 58 Celsius, and latent heat of 226/265 kJ/kg.

Metal foams, for example of aluminium, aluminium alloys or copper, may be used to improve the heat transfer properties of the thermal storage material—notably when paraffin wax is used as the thermal storage material.

Figure 3:
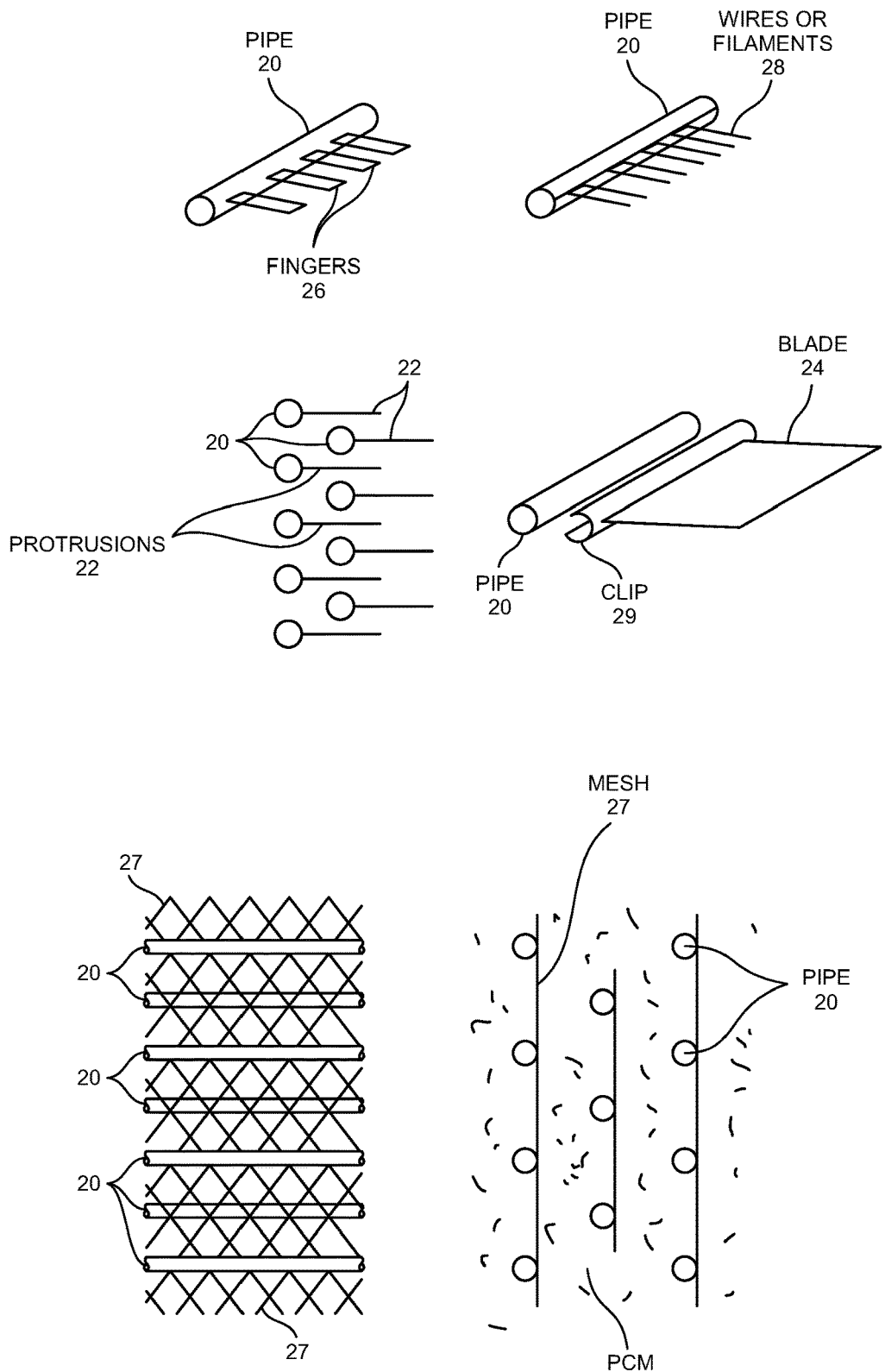
FIG. 3 is a schematic diagram showing arrangements to improve heat transfer within a heat exchanger of an interface unit such as that shown in FIG. 2.

Alternatively, as shown schematically in FIG. 3, the heat transfer pipes 20 of the input and output circuits of the heat exchanger may be provided with protrusions 22—blades 24, fingers 26, wires or filaments 28, formed of a material with a high thermal conductivity—such as copper, a copper alloy, or carbon fibre, which extend into the mass of thermal storage material (e.g. wax) to effectively improve energy transfer from the fluid in the input circuit into the thermal storage mass, throughout the thermal storage mass, and from the thermal storage mass into the water in the output circuit of the heat exchanger. It can be seen here that the input-side and output-side circuit within the enclosure of the heat exchanger are defined by tubular bodies, and filamentary protrusions may be provided extending into the phase change material from each of the tubular bodies, wherein the filamentary protrusions have higher conductivity than the phase change material.

For example, copper wires 28 or copper blades 24 or fingers 26 can be directly attached, e.g. by welding, to the copper pipes 20 (a preferred choice of material for the circuits of the heat exchanger giving the preponderance of copper usage in domestic heating and water systems: for installations that use aluminium alloy pipework and radiant bodies, it may be preferred, for electrochemical reasons, to also make the heat exchanger input and output circuits and protrusions 22 from aluminium or an alloy thereof) that provide the input and output circuits, a free end of each protrusion 22 extending away from the pipe 20 to which it is attached. Alternatively, each heat transfer blade 24, or possibly multiple heat transfer wires 28 or finger 26 could be attached to a sprung clip 29 (e.g. of phosphor bronze) which is clipped over and thereby secured to a pipe of one or other of the input and output circuits of the heat exchanger.

Alternatively, as also shown in FIG. 3, the pipes that define the input circuit of the heat exchanger may be secured to a heat transfer mesh 27. For example, the filamentary protrusions may together form one or more meshes.

Figure 4:
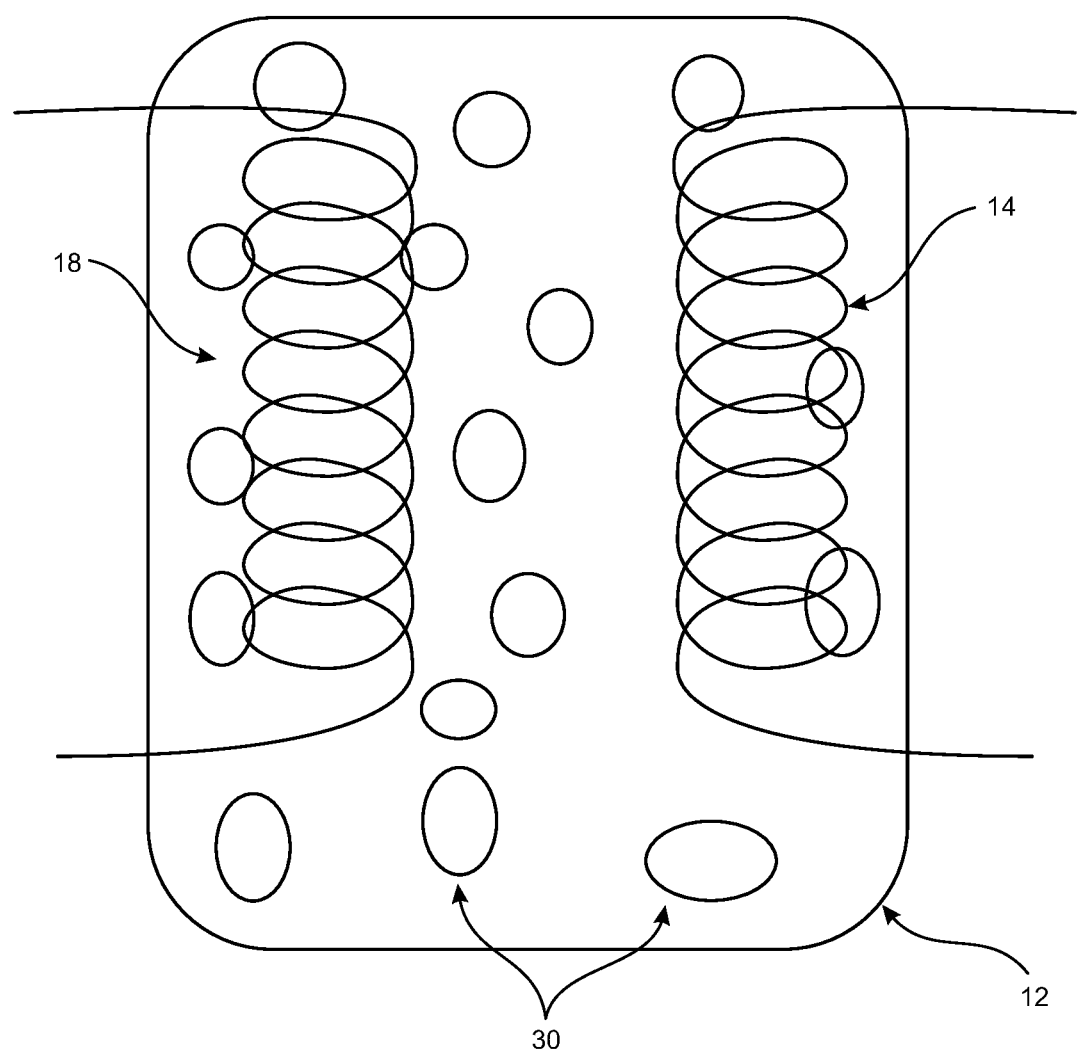
FIG. 4 is a schematic diagram showing arrangements to compensate reversibly for expansion of a phase change material such as occur with a change of phase from solid to liquid.

The thermal expansion of paraffin wax phase change materials in the phase change from solid to liquid is around 10% by volume. It is desirable to provide some form of compensation for this change in volume to avoid imposing significant mechanical stresses on the structure of the heat exchanger. One possible way to provide such compensation is to include within the body of phase change material inclusions which are reversibly compressible. This is illustrated, schematically, in FIG. 4, where inclusions 30 are distributed throughout the mass of phase change material. It will be appreciated that FIG. 3 has been simplified, for ease of understanding, by omitting any pipework or heat transfer elements associated with the input and output circuits. These inclusions could be, for example, a solid resiliently compressible material such as sponge rubber (either natural or synthetic). Alternatively, the inclusions could be closed hollow bodies with an internal pressure low enough to enable them to be compressed by the increase in pressure caused by change of phase (typically expansion on liquefaction) of the phase change material. Thus, the enclosure includes a plurality of resilient bodies that are configured to: reduce in volume in response to an increase in pressure caused by liquefaction of the phase; and expand again in response to a reduction in pressure caused by solidification of the phase change material.

Figure 5:
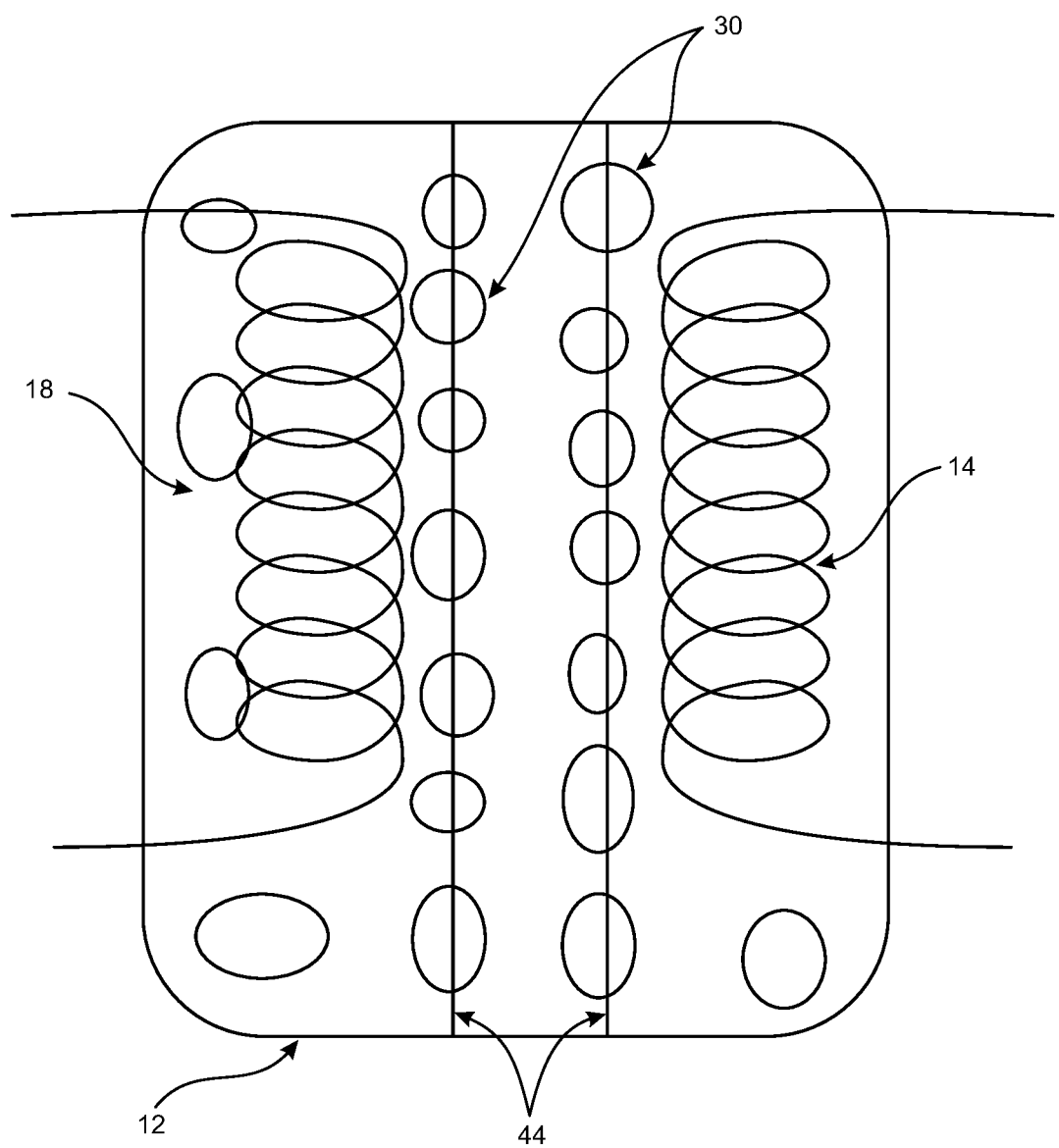
FIG. 5 is a schematic diagram showing an arrangement to compensate reversibly for expansion of a phase change material such as occur with a change of phase from solid to liquid.

These inclusions could be held in place by the structure of the matrix of the heat exchanger, i.e. the arrangement of pipes and heat transfer protrusions, et cetera. But it may practically be difficult to ensure that the inclusions don't cluster, aggregate, rise to the top or fall to the bottom of the mass of phase change material. One way to avoid this, and to ensure that the inclusions 30 stay in place, would be to secure the inclusions to a fixed support structure 44 such as a lattice or framework—as indicated schematically in FIG. 5. Thus, the resilient bodies are coupled to a matrix or lattice structure 44 which serves to restrict displacement of the resilient bodies.

Figure 6:
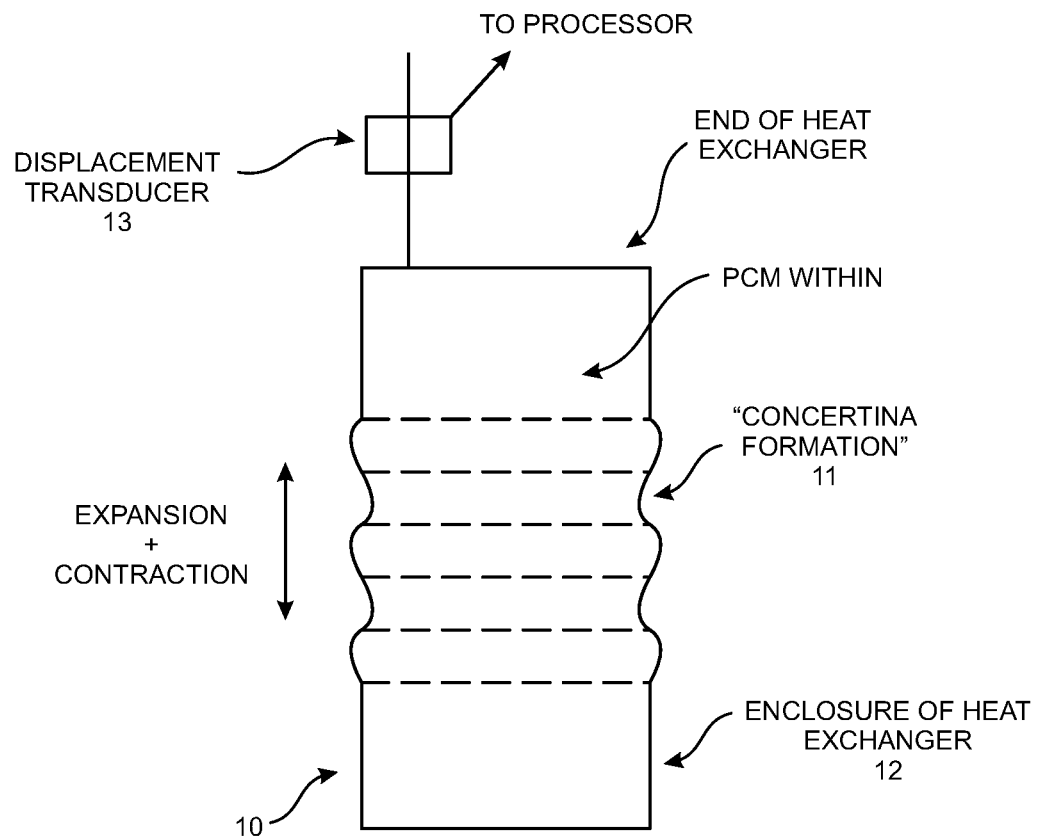
FIG. 6 is a schematic diagram showing another arrangement to compensate reversibly for expansion of a phase change material such as occur with a change of phase from solid to liquid.

An alternative approach to managing the problem of expansion of the phase change material in its transition from liquid to solid is illustrated schematically in FIG. 6. This shows a portion of the enclosure of the heat exchanger which is provided with a concertina formation 11 to reversibly accommodate the expansion and contraction of the phase change material as the phase change material goes from a liquid form to a solid form and back. Such a formation could be built in to walls of the enclosure of the heat exchanger at one end. Clearly, when designing a heat exchanger with such an expansion zone, care needs to be taken to avoid imposing any undesirable stresses and strains on the conduits that form the input and output circuits, and also on the connections which interface with the circuits. Generally, this will mean that the expansion zone 11, which for convenience of description we here refer to as a concertina formation, is provided in the region of the enclosure beyond any points of attachment to the conduits of the input and output circuits and their interconnections.

Optionally, as shown in the figure, in the expansion and contraction of the enclosure of the heat exchanger can be used to provide information on the state of the phase change material to the processor of the system by providing some form of displacement transducer 13 which is coupled to the processor.

Figure 7:
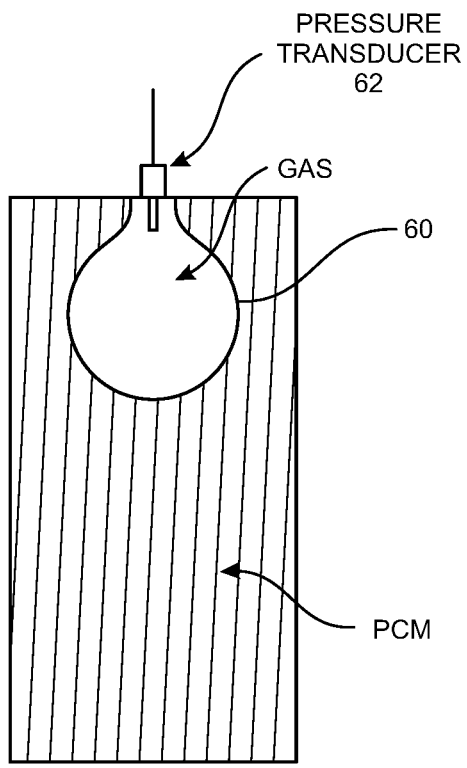
FIG. 7 is a schematic diagram showing how monitoring pressure within a body of phase change material can provide information on the energy storage state of the material.

An alternative way of monitoring the state of the phase change material, based on its internal pressure, is illustrated schematically in FIG. 7. This shows a compressible body 60 within the mass of phase change material, the compressible body 60 having an inner volume, containing a gas or liquid, the inner volume being coupled to a pressure transducer 62 (preferably located outside the inner volume of the enclosure of the heat exchanger). The pressure transducer 62 is coupled to the processor of the interface unit. The processor of the interface unit therefore receives the signal relating to the degree of solidification/liquification of the phase change material—which provides information on an energy storage amount of the phase change material. The compressible body could be made of a polymeric material such as a natural or synthetic rubber, or plastics material. Preferably in this case the compressible body is filled with a suitable liquid which will remain liquid throughout the operating temperature range of the heat exchanger, as this reduces the risk of fluid from within the compressible body escaping over time. Alternatively, a metal body may be used with either a liquid or gaseous filling, to reduce the likelihood that fluid will escape from within the compressible body. The processor of the interface unit can be programmed during manufacture, or subsequently, based on empirical analysis of prototypes, so that the degree of solidification (more generally, the state) of the phase change material can be mapped to pressure signals from the pressure transducer 62. For example, preproduction prototypes may be fitted with a glass side panel so that the state of the phase change material can be determined by inspection/analysis, and the state mapped against pressure signals from the pressure transducer 62, knowledge of the latent heat of fusion of the phase change material being used will enable the amount of latent heat stored in the heat exchanger to be calculated for every pressure measured. Data obtained in this way can then be used in programming the processors for production interface unit, and in informing machine learning algorithms in this and potentially other processors in the system. It would also be possible to combine the ideas represented in FIGS. 6 and 7, based for example on empirical testing of preproduction prototypes.

Another method of monitoring the state of the phase change material which could be provided as an alternative to previously described methods, or in addition to one or more of these, would be to provide one or more optical sources to emit optical radiation into the body of phase change material fraud detection by one or more appropriately located optical sensors (an optical sensing arrangement). The one or more optical sources could operate on a single wavelength, or range of wavelengths (i.e., in effect a single colour), or could operate at two or more spaced apart wavelengths (i.e. different colours). The radiation could be in the visible or infrared regions of the spectrum, or both in the event that multiple colours of light are used. The optical source could be a source of incoherent light, such as an LED, or could be a laser, e.g., an LED laser. The optical source could be a single red green blue light emitting diode. The optical sensing arrangement can be coupled to a processor (e.g. the processor of the interface unit) which is configured to estimate an amount of energy stored in the phase change material based on information received from the optical sensing arrangement.

Another method of monitoring the state of the phase change material which could be provided as an alternative to previously described methods, or in addition to one or more of these, would be to provide an acoustic source configured to launch sound into the phase change material within the heat exchanger, and an acoustic sensing arrangement to detect sound launched from the acoustic source after the sound has passed through the phase change material. Preferably, the acoustic source is configured to produce ultrasound.

Thus far, the thermal energy store has largely been described as having a single mass of phase change material within a heat exchanger that has input and output circuits each in the form of one or more coils or loops. But it may also be beneficial in terms of rate of heat transfer for example, to encapsulate the phase change material in a plurality of sealed bodies—for example in metal (e.g. copper or copper alloy) cylinders (or other elongate forms)—which are surrounded by a heat transfer liquid from which the output circuit (which is preferably used to provide hot water for a (domestic) hot water system) extracts heat.

With such a configuration the heat transfer liquid may either be sealed in the heat exchanger or, more preferably, the heat transfer liquid may flow through the energy store and may be the heat transfer liquid that transfers heat from the green energy source (e.g. a heat pump) without the use of an input heat transfer coil in the energy store. In this way, the input circuit may be provided simply by one (or more generally multiple) inlets and one or more outlets, so that heat transfer liquid passes freely through the heat exchanger, without being confined by a coil or other regular conduit, the heat transfer liquid transferring heat to or from the encapsulated PCM and then on to the output circuit (and thus to water in the output circuit). In this way, the input circuit is defined by the one or more inlets and the one or more out for the heat transfer liquid, and the freeform path(s) past the encapsulated PCM and through the energy store.

Preferably the PCM is encapsulated in multiple elongate closed-ended pipes arranged in one or more spaced arrangements (such as staggered rows of pipes, each row comprising a plurality of spaced apart pipes) with the heat transfer fluid preferably arranged to flow laterally (or transverse to the length of the pipe or other encapsulating enclosure) over the pipes—either on route from the inlets to the outlets or, if an input coil is used, as directed by one or more impellers provided within the thermal energy store.

Optionally, the output circuit may be arranged to be at the top of the energy store and positioned over and above the encapsulated PCM— the containers of which may be disposed horizontally and either above an input loop or coil (so that convection supports energy transfer upwards through the energy store) or with inlets direction incoming heat transfer liquid against the encapsulated PCM and optionally towards the output circuit above. If one or more impellers is used, preferably the or each impeller is magnetically coupled to an externally mounted motor—so that the integrity of the enclosure of the energy store is not compromised.

Optionally the PCM may be encapsulated in elongate tubes, typically of circular cross section, with nominal external diameters in the range of 20 to 67 mm, for example 22 mm, 28 mm, 35 mm, 42 mm, 54 mm, or 67 mm, and typically these tubes will be formed of a copper suitable for plumbing use. Preferably, the pipes are between 22 mm and 54 mm, for example between 28 mm and 42 mm external diameter.

The heat transfer liquid is preferably water or a water-based liquid such as water mixed with one or more of a flow additive, a corrosion inhibitor, an anti-freeze, a biocide,— and may for example comprise an inhibitor of the type designed for use in central heating systems—such as Sentinel X100 or Fernox F1 (both RTM)—suitably diluted in water.

Thus, throughout the description and claims of the present application the expression input circuit should be construed, unless the context clearly requires otherwise, to include an arrangement as just described and in which the path of liquid flow from the input of the input circuit to its output is not defined by a regular conduit but rather involves the liquid flowing substantially freely within the enclosure of the energy store.

The PCM may be encapsulated in a plurality of elongate cylinders of circular or generally circular cross section, the cylinders preferably being arranged spaced apart in one or more rows. Preferably the cylinders in adjacent rows are offset with respect to each other to facilitate heat transfer from and to the heat transfer liquid. Optionally an input arrangement is provided in which heat transfer liquid is introduced to the space about the encapsulating bodies by one or more input ports which may be in the form of a plurality of input nozzles, that direct the input heat transfer liquid towards and onto the encapsulating bodies fed by an input manifold. The bores of the nozzles at their outputs may be generally circular in section or may be elongate to produce a jet or stream of liquid that more effectively transfers heat to the encapsulated PCM. The manifold may be fed from a single end or from opposed ends with a view to increasing the flow rate and reducing pressure loss.

The heat transfer liquid may be pumped into the energy store 12 as the result of action of a pump of the green energy source (e.g. a heat pump or solar hot water system), or of another system pump, or the thermal energy store may include its own pump. After emerging from the energy store at one or more outlets of the input circuit the heat transfer liquid may pass directly back to the energy source (e.g. the heat pump) or may be switchable, through the use of one or more valves, to pass first to a heating installation (e.g. underfloor heating, radiators, or some other form of space heating) before returning to the green energy source.

The encapsulating bodies may be disposed horizontally with the coil of the output circuit positioned above and over the encapsulating bodies. It will be appreciated that this is merely one of many possible arrangements and orientations. The same arrangement could equally well be positioned with the encapsulating bodies arranged vertically.

Alternatively an energy store using PCM encapsulation may again use cylindrical elongate encapsulation bodies such as those previously described, but in this case with an input circuit in the form of conduit for example in the form of a coil. The encapsulation bodies may be arranged with their long axes disposed vertically, and the input 14 and output 18 coils disposed to either side of the energy store 12. But again this arrangement could also be used in an alternative orientation, such as with the input circuit at the bottom and the output circuit at the top, and the encapsulation bodies with their long axes disposed horizontally. Preferably one or more impellers are arranged within the energy store 12 to propel energy transfer liquid from around the input coil 14 towards the encapsulation bodies. The or each impeller is preferably coupled via a magnetic drive system to an externally mounted drive unit (for example an electric motor) so that the enclosure of the energy store 12 does not need to be perforated to accept a drive shaft— thereby reducing the risk of leaks where such shafts enter the enclosure.

By virtue of the fact that the PCM is encapsulated it becomes readily possible to construct an energy store that uses more than one phase change material for energy storage, and in particular permits the creation of an energy storage unit in which PCMs with different transition (e.g.

melting) temperatures can be combined thereby extending the operating temperature of the energy store.

It will be appreciated that in embodiments of the type just described the energy store 12 contains one or more phase change materials to store energy as latent heat in combination with a heat transfer liquid (such as water or a water/inhibitor solution).

A plurality of resilient bodies that are configured to reduce in volume in response to an increase in pressure caused by a phase change of the phase change material and to expand again in response to a reduction in pressure caused by a reverse phase change of the phase change material are preferably provided with the phase change material within the encapsulation bodies (they may also be used in energy banks using "bulk" PCMs as described elsewhere in this specification.

Figure 8:
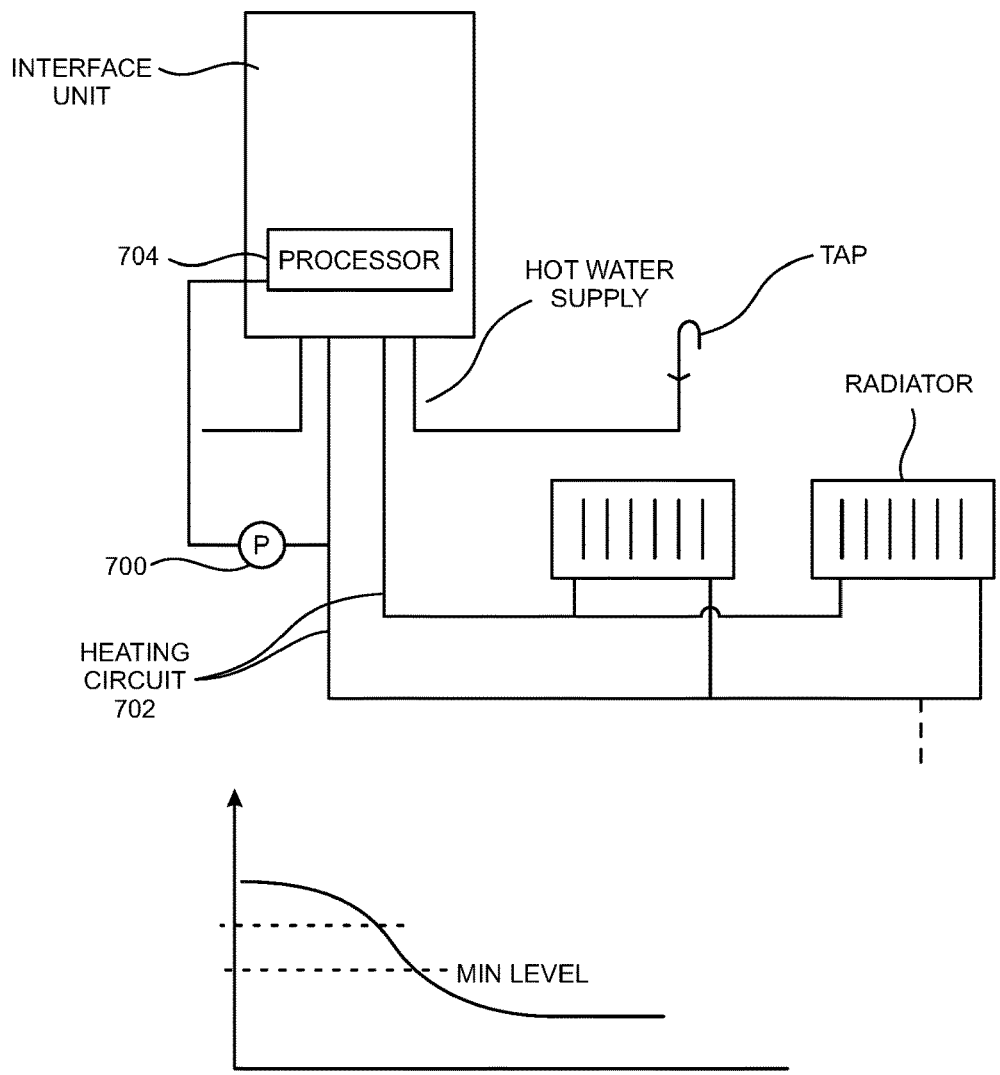
FIG. 8 is a schematic diagram showing details of an in-building heating system, including a pressure sensing arrangement, according to an aspect of the disclosure.

As will be appreciated, the disclosure provides an installation comprising an in-building hot water system including an interface unit as described in any alternative above, the input-side circuit of the heat exchanger being coupled to a heat pump, and the output-side circuit of the heat exchanger being coupled to the in-building hot water system. Preferably in such an installation an in-building heating circuit is coupled to the input-side circuit of the heat exchanger and the heat pump. Optionally, as shown in FIG. 8 such an in-building heating circuit 702 includes at least one pressure sensor 700 coupled to a processor 704 of the installation, the processor 704 being configured to monitor the pressure of the in-building heating circuit 702 and to flag an alert in the event that the pressure falls outside a predetermined range, for example due to a failure of an expansion vessel. The pressure sensing can also warn of overpressure—which may arise due to a failure of a pressure relief valve in combination with an oversupply of energy.

The disclosure also provides an installation comprising an in-building hot water system including an interface unit as described in any alternative above, the input-side circuit of the heat exchanger being coupled to a heat pump, the output-side circuit of the heat exchanger being coupled to the in-building hot water system having a flow sensor and a temperature sensor, an electrical heater configured to heat water for the hot water system downstream of the output-side circuit of the heat exchanger, and a processor operatively coupled to the heat pump, the flow sensor, the temperature sensor and the electrical heater, wherein the processor is provided with logic to manage the use of the electric heater, the heat pump, and energy from the phase change material to reduce energy consumption.

The disclosure further provides an installation comprising an in-building hot water system including an interface unit as described in any alternative above, the input-side circuit of the heat exchanger being coupled to a heat pump, the output-side circuit of the heat exchanger being coupled to the in-building hot water system having a flow sensor and a temperature sensor, an electrical heater configured to heat water for the hot water system downstream of the output-side circuit of the heat exchanger, and a processor operatively coupled to the heat pump, the flow sensor, the temperature sensor and the electrical heater, wherein the processor is provided with logic to manage the installation to provide a flow of hot water requiring a greater power input than the power of the heat pump.

Any of these installations further may further comprise one or more additional heat exchangers, the or each additional heat exchanger comprising an enclosure, and within the enclosure: an input-side circuit coupled to the heat pump; an output-side circuit coupled to the in-building hot water system; and a phase-change material for the storage of energy.

Optionally, the installation may further comprise a pressure sensor in a cold water supply to the in-building hot water system, and a processor coupled to the pressure sensor, the processor being configured to generate a warning in the event that a loss of pressure is detected. Optionally, the processor is configured only to generate a warning in the event that the loss of pressure continues for more than a threshold time. Optionally, the installation further comprising a flow sensor in a cold water supply to the in-building hot water system, the flow sensor being coupled to the processor. Optionally, the processor is configured to use information from both the pressure sensor and the flow sensor in generating the warning.

The disclosure also provides a method of replacing a gas-fired combination boiler which is plumbed into an in-building hot water system, the method comprising: removing the gas-fired combination boiler to create an installation space; installing an interface unit as described in any alternative above in the installation space; coupling the output-side circuit of the heat exchanger to the in building hot water; and coupling the input-side circuit of the heat exchanger to the heat pump, so that water for the in-building hot water system can be heated by the heat phase change material and/or the heat pump. Preferably, this method further comprising coupling the input-side circuit of the heat exchanger to an in-building space heating system. Preferably, the method further comprises operatively connecting a processor of the interface unit to a controller of the heat pump, to enable the processor to control aspects of the behaviour of the heat pump.

The processor of the interface unit is configured to control the heat pump, the energy bank, and the instantaneous water heater. In order to be able to do this, the processor is provided with information on the status of the energy bank, the status of the heat pump, and preferably information about the water flow rate. The information about water flow rate may be provided by a flow measurement device in the relevant flow path, but may also be based on a recognition of the outlet that has been opened—as will be described later. With knowledge of the relevant outlet or relevant outlet type, a prediction may be made of the likely duration of the demand for water. For example, if the outlet that has been opened is associated with a hand basin in a cloakroom, it can be expected that the outlet will be closed again within no more than about 60 seconds—because it is highly likely that the demand for hot water is because someone wants to wash their hands. Conversely, if the outlet that has been opened is that serving a bath, it can confidently be predicted that the demand for water will continue for more than five minutes.

The processor can also be provided with logic to improve management of the various heating resources, based on time of day, day of the week, season, and stored all learned behaviour of the household. For example, a family with school-age children can reliably be predicted to have the same pattern of hot water demands between say 7 AM and 8:30 AM from Monday to Friday during school terms, but to have a very different pattern of behaviour, typically rather later in the morning, at weekends, and during school holidays.

In order to provide the processor with information on the status of the energy bank, the energy bank is provided with one or more sensors to provide status information, for example based on optical or sonic analysis of the phase change material, or on an internal pressure within the energy bank, and or a displacement measurement based on an expansion or contraction of the enclosure of the energy bank. The processor is in bidirectional communication with the heat pump, and is arranged to receive status information from the heat pump. The processor is also aware of its history of demands on the heat pump. Conventionally heat pumps are configured to start no more than typically six times per hour, and their internal processors carry out checks and monitor the status of the compressor, pumps, etc., and these data are used by the internal processor of the heat pump in deciding whether or not to comply with a start request. Typically, if the processor of the heat pump cannot comply with a start request, it will inform the requester (in this case the processor of the interface unit) that it cannot comply with the request to start.

As already mentioned, a hot water installation including an interface unit as previously described may optionally include an instantaneous water heater, for example an electric heater in the flow path downstream of (or in parallel with) the energy bank. The instantaneous water heater should also be under the control of the processor of interface unit. The processor of the interface unit is preferably configured to manage the instantaneous water heater, the PCM energy bank, and the heat pump to satisfy demands for hot water economically. The processor of the interface unit is preferably connected to the Internet, at least intermittently, and is in this, or some other, way made aware of tariff information for the electrical supply to which the heat pump, interface unit, and electrical instantaneous heater are connected. In this way, the processor is able to take advantage of low electrical tariffs as and when they arise. For example, if the processor of the interface unit becomes aware that electricity is cheap or is going to become cheap at the time of predicted or known demand, or shortly before such predicted or known demand, then the processor can instruct the heat pump to operate to put energy into the energy bank, so that the energy in the energy bank can be used when the demand arises.

The processor of the interface unit may also control one or more flow regulators in the hot water supply as part of its management process, along with controlling the various energy sources.

Figure 9:
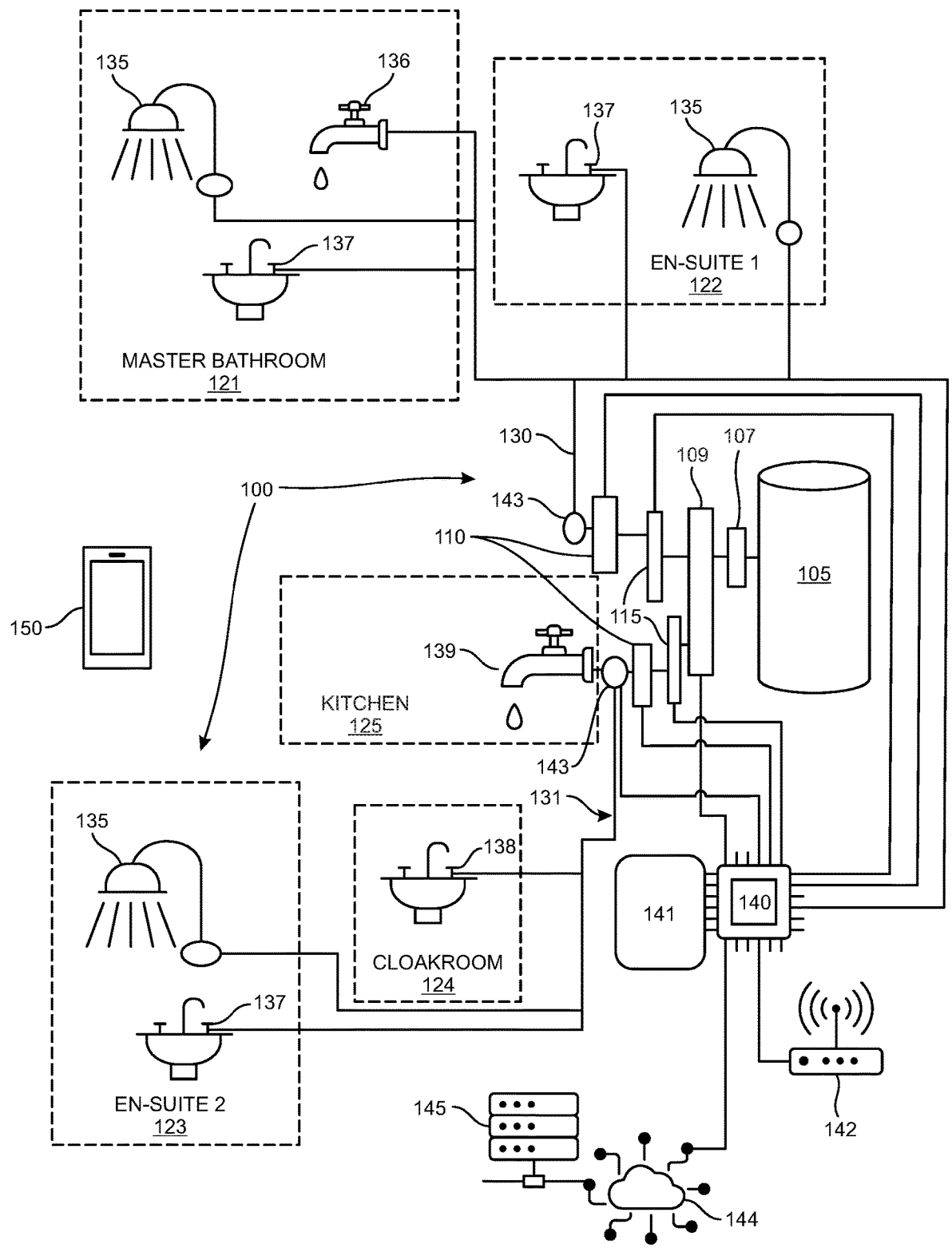
FIG. 9 is a schematic diagram showing an in-building water supply installation according to an aspect of the disclosure.

FIG. 9 shows schematically an in-building water supply installation 100 having a plurality of controllable water outlets (various taps and showers that will be described more fully later), a supply of water 105, and in a water flow path between the supply of water 105 and the plurality of controllable water outlets, at least one flow measurement device 110 and at least one flow regulator 115, and a processor 140 operatively connected to the at least one flow measurement device 110 and the at least one flow regulator 115. The illustrated water supply installation represents a dwelling with a master bathroom 121, a first en-suite shower room 122, a second en-suite shower room 123, a cloakroom 124, and a kitchen 125. The master bathroom and the first en-suite shower room may be on one floor of the dwelling, whereas the cloakroom, second en-suite and kitchen may be on another floor of the dwelling. In such a situation, it may be convenient to have, as shown, two separate circuits, 130 and 131, to supply water to the various outlets.

The master bathroom 121 is shown as including a shower outlet 135, a bath tap or faucet 136, and a tap 137 for a sink. The en-suite shower rooms 122 and 123 also include a shower outlet 135, and a tap 137 for a sink. Conversely, the cloakroom contains just a W.C. (not shown) and a hand basin with a tap 138. Finally, the kitchen has a sink with a tap 139.

A processor, or system controller, 140, with an associated memory 141, is coupled to the at least one flow measurement device 110 and the at least one flow regulator 115. It will be appreciated that each of the two circuits 130 and 131 is provided with a respective flow measurement device 110 and flow regulator 115 The processor is also optionally connected to one or more temperature sensors 143, one for each of the circuits 130 and 131.

The processor is also coupled to an RF transceiver 142, which includes at least one RF transmitter and at least one RF receiver, for bidirectional communication via Wi-Fi, Bluetooth, or ZigBee or the like, and preferably also to the Internet 144 for connection to a server or central station 145, and optionally to a cellular radio network (such as LTE, UMTS, 4G, 5G, etc.). By means of the RF transceiver 142 and/or the connection to the Internet, the processor 140 is able to communicate with a mobile device 150, which may for example be a smart phone or tablet, for use by an installation engineer in mapping the in-building water supply installation. The mobile device 150 includes software, such as a specific app, that co-operates with corresponding software in the system controller 140 and also potentially within server 145, to facilitate the mapping methods according to embodiments of the invention, and in particular to synchronize actions taken by the engineer to a clock of the system controller 140/server 145. The memory 141 contains code to enable the processor to perform a method of mapping an in-building water supply installation processor, for example during a process of commissioning a new installation. For the sake of description, consider FIG. 9 to show a hot water supply installation, although it could equally be a cold-water supply installation.

During the commissioning process an engineer will be asked by the processor/system controller 140 to define all hot water outlets (for e.g., tap, shower, bath, kitchen). The system controller will ask the engineer to fully open each of the outlets (taps, shower outlets, etc.) and will monitor the resulting water flow, by means of the relevant flow measurement device 110. During this process, the relevant flow measurement device 110 will measure water flow and the processor will receive these data and will add the results to a database. Based on this information, the system will subsequently be able to provide the most efficient flow into each single tap, by controlling the relevant flow control device 115, when any outlet is opened.

A method of mapping an in-building water supply installation according to a first aspect of the disclosure will now be described with reference to FIG. 9.

The method comprises opening a first of the plurality of controllable water outlets and processing signals from the at least one flow measurement device 110 with the processor 140 at least until a first flow characteristic is determined, and then closing the first of the plurality of controllable water outlets. The opening of the first of the plurality of controllable water outlets is preferably instructed by the processor or system controller 140 sending a message to the mobile device 150 carried by the relevant engineer. For example, the instruction may be sent by Wi-Fi and tell the engineer to open the hot bath tap 136 in the master bathroom 121. The engineer, carrying the mobile device 150, then goes to the master bathroom and opens the hot bath tap 136 fully. The mobile device may provide the engineer with a prompt, preferably audible and with a countdown, to tell the engineer when precisely to open the tap. Alternatively, the app on the mobile device may be configured to accept an input from the engineer, such as the pressing or release of a button, at the moment that the tap 136 is opened. In either case, the app may optionally capture a local time for the prompt or the moment, and then send this local time, along with the identity of the relevant controllable outlet, to the system controller 140 or server 145. In this way, delays in the prompt reaching the mobile device 150 or of the timing of the instruction reaching the controller 140 or server 145 can be accounted for (the mobile device 150 and the system controller 140 preferably go through some handshaking procedure, either before or after the mapping process, so that offsets between the clocks of the two devices can be eliminated or they can also be accounted for)—although this may in practice not be necessary. The most important input back to the system is the water temperature change during the test time.

The engineer may then work her way around the premises selecting an outlet identity from a list or menu on the app, or entering an unambiguous identifier, opening each of the outlets in turn. Or the system controller may already have been provided with a list of all the taps, etc. (generally "controllable outlets") and may prompt the engineer, by sending another message to the mobile device 150, to go to the relevant outlet. The app preferably includes the option for the engineer to send a message to the system controller 140/server 145, that she is in place and ready to receive an instruction to open the next controllable outlet. The process is then repeated for each of the other hot water outlets, until all the outlets and their flow characteristics—namely the lag before flow is detected, the rate of rise of flow, the maximum flow rate, water temperature, temperature increase delay, and any other identifiable characteristics have been captured and stored in a database. By using the characteristics stored in the database, the processor 140 is subsequently able to identify the opening of a particular one of the plurality of controllable water outlets based on the similarity of a detected flow characteristic to a respective flow characteristic.

The processor is also provided with some rules concerning preferred flow rates and, optionally, flow durations, based on the type of outlet (bath tap, kitchen tap, basin tap, cloakroom tap) and its location (main bathroom, en-suite, child's room, adult's room, cloakroom, kitchen, for example), and use these rules, along with the outlet identity recognised from the detected flow characteristics, to determine a target flow rate. The targeted flow rate is then imposed by the system controller 140 by controlling the relevant flow controller 115, and preferably monitored by the corresponding flow measurement device 110. In this way, by controlling at least one flow regulator, based on the identification of the relevant outlet, the processor 140 is able control a supply of water to the identified controllable water outlet.

Each of the respective flow characteristic may include a respective stable flow rate. The method may then further comprise configuring the processor 140 to control the at least one flow regulator 115 to impose at least a 10% cut in the flow rate to each of each of the plurality of controllable water outlets, based on the respective stable flow rate. Optionally, the method may further comprise configuring the processor 140 to control the at least one flow regulator 115 to impose at least a 10% cut in the flow rate, based on respective stable flow rate, to any of the plurality of controllable water outlets whose respective stable flow rate is greater than 7 litres per minute. This is of particular application for taps that serve basins in bathrooms, en suites, and most particularly cloakrooms, where taps are often largely used to provide water for handwashing—which can be achieved effectively with quite modest flow rates.

Figure 10:
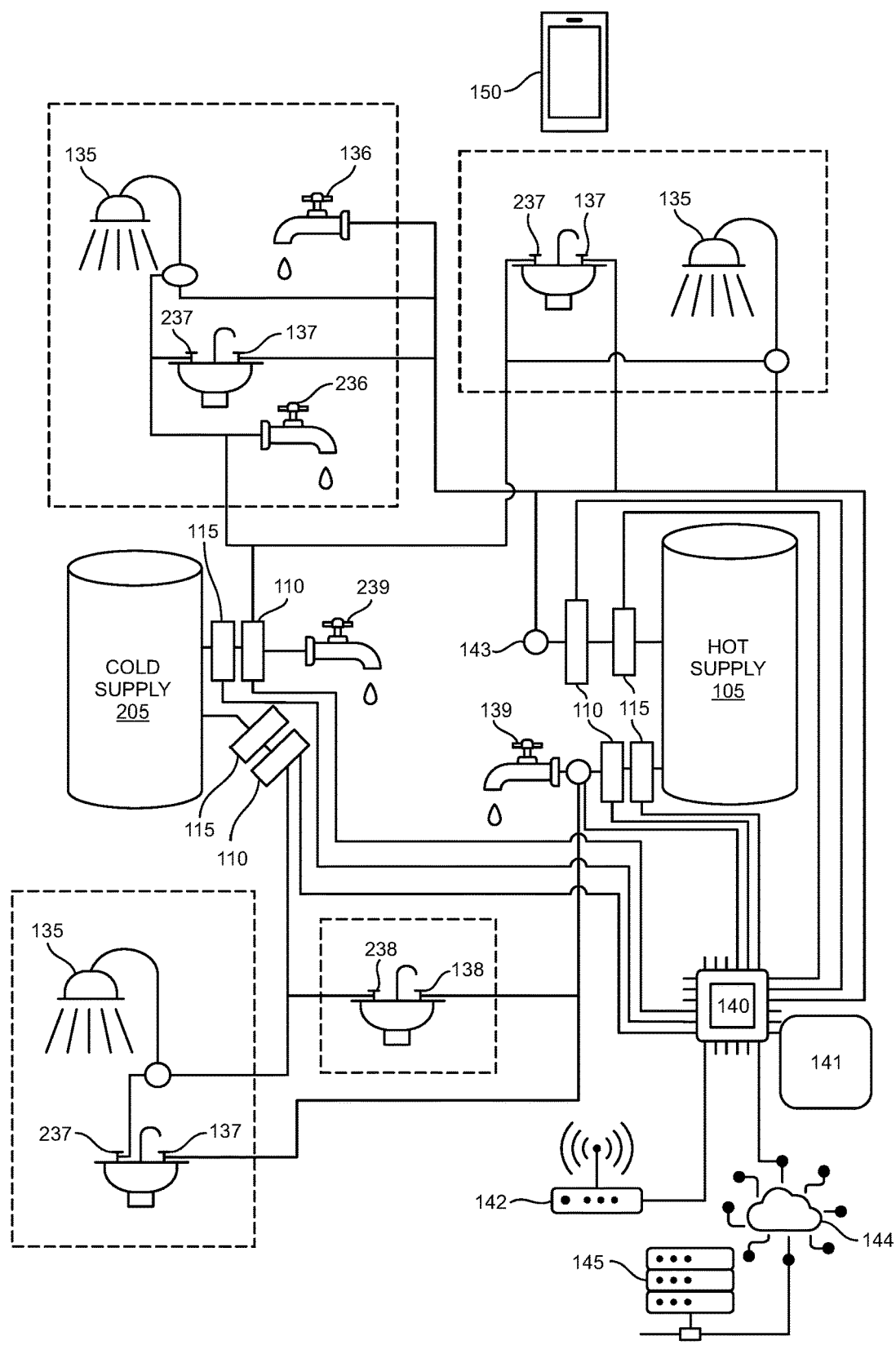
FIG. 10 is a schematic diagram showing an in-building water supply installation, including both a hot-water and a cold-water supply, according to an aspect of the disclosure.

FIG. 10 corresponds to FIG. 9 but shows schematically an installation including both hot 105 and cold 205 water supplies, with controllable outlets corresponding to those already introduced in FIG. 9. Thus, the bath in the master bathroom 121 is provided with a cold-water tap 236 along with hot water tap 136, and the basin has both a cold-water tap 237 and a hot-water tap 137. The shower outlet is also connected to both the hot and cold-water supplies. Likewise, in each of the other rooms cold water taps corresponding to the hot water taps are present. These pairs of hot and cold taps may be separate or they may be monoblock, where the two taps are integrated into a whole. Monoblock taps may include separate controls for each of the hot and cold supplies, or they may be mixer taps which have a single control that controls both the amount of hot and cold water and the proportion of the flow that comes from each of the two sources. But in all of these arrangements it is possible to set the tap to give maximum flow of one water type with no water of the other type—i.e. 100% water from the hot supply, or 100% water from the cold supply. In this way it is possible to set any of the taps appropriately for the mapping operation to be described below. This is also generally true of shower mixers too, although they require more care to set to a single source flow.

The cold-water outlets can be mapped using the process described with reference to FIG. 9.

It will be recognised that what has just been described is a processor 140 and memory 141 for use in mapping an in-building water supply installation having a source of water 105, a plurality of controllable water outlets 135, 136, 137, coupled to the source of water 105, and at least one flow measurement device 110 and at least one flow regulator 115 in a water flow path 130, 131, between the source of water 105 and the plurality of controllable water outlets 135, 136, 137. The processor 140 is configured for operative connection to the at least one flow measurement device 110 and the at least one flow regulator 115. The memory 141, which is operatively coupled to the processor 140, stores instructions that cause the processor 140 to perform a method of mapping the water supply installation in which method the processor 140 processes signals received from the at least one flow measurement device 110 consequent on the opening of a first of the plurality of controllable water outlets at least until a first flow characteristic is determined. After the closing of the first of the plurality of controllable water outlets, repeating the operations for each of the other controllable water outlets of the plurality to determine for each controllable water outlets a respective flow characteristic. Thereafter, the processor is configured to identify the opening of a particular one of the plurality of controllable water outlets based on the similarity of a detected flow characteristic to a respective flow characteristic, and to control said at least one flow regulator, based on the identification, to control a supply of water from the source of water to the identified controllable water outlet.

The disclosure also provides a computer program comprising instructions which, when the program is executed by a processor 140, cause the processor 140 to carry out the method as just described. The computer program may be loaded into the memory 141 either prior to installation, or may subsequently be downloaded from the server 145 or uploaded from another device, for example using a wired data link or using an RF link of some kind.

The memory 141 may thus constitute a computer-readable storage medium comprising instructions which, when executed by a processor, cause the processor to carry out the method as previously described.

The disclosure also provides a water supply installation including a source of water 105, a plurality of controllable water outlets coupled to the source of water 105, a flow measurement device 110 and at least one flow regulator 115 in a water flow path between the source of water 105 and the plurality of controllable water outlets, together with a processor 140 and memory 141 as just described, the processor 140 being operatively connected to the flow measurement device 110 and the at least one flow regulator 115.

Although in FIGS. 9 and 10 the cold and hot water supplies are, for ease of illustration, both represented simply as containers, it will be appreciated that in practice both water supplies are likely to be fed from some kind of continuous feed, such as a water main. Both supplies may also use some kind of reservoir or accumulator, but this is not essential. Nor, of course, is it essential for either water supply to be connected to any water main—it may be, for example, that one or both water supplies is fed from a storage reservoir.

The present application contains a number of self-evidently inter-related aspects and embodiments, generally based around a common set of problems, even if many aspects do have broader applicability. In particular the logic and control methods, whilst not necessarily limited to operating with the hardware disclosed and may be more broadly applied, are all particularly suited to working with the hardware of the various hardware aspects and the preferred variants thereof. It will be appreciated by the skilled person that certain aspects relate to specific instances of other features and the preferred features described or claimed in particular aspects may be applied to others. The disclosure would become unmanageably long if explicit mention were made at every point of the inter-operability and the skilled person is expected to appreciate, and is hereby explicitly instructed to appreciate, that preferred features of any aspect may be applied to any other unless otherwise explicitly stated otherwise or manifestly inappropriate from the context. Again, for the sake of avoiding repetition, many aspects and concepts may be described only in method form or in hardware form but the corresponding apparatus or computer program or logic is also to be taken as disclosed in the case of a method or the method of operating the hardware in the case of an apparatus discussion. For an example of what is meant by the above, there are a number of features of both hardware and software relating to the combination of a fluid based (typically air source) heat pump and a phase change material and an electric supplementary heating element and control by a processor (within the unit or remote or both). Although this is the preferred application, most methods and hardware are more generally applicable to other heat pumps (thermoelectric and ground source) and to other renewable energy sources (a pump for a solar array for example) and to alternative supplementary heating (including the less preferred arrangement of a combustion heater such as a gas boiler, or even a less efficient higher temperature lower COP heat pump) and alternative thermal storage, including multi-temperature thermal storage arrays. Moreover, aspects which give particular arrangements for any of the components or their interaction can be used freely with aspects which focus on alternative elements of the system. The appended claims are presented as distinct sets and are not numbered consecutively in this application nor are they explicitly cross-referenced for ease of following each aspect and for the benefit of subsequent applications. However, all appended claims should be considered to be multiply dependent on all other sets of claims except where they self-evidently relate to incompatible alternatives, as would be understood by a skilled engineer rather than construed in an artificially reductive way relying only on explicit cross references.

The invention claimed is:

1. An installation comprising:
an in-building hot water supply system;
a heat pump arranged to heat water in the hot water supply system;
an energy storage arrangement containing a mass of energy storage medium having enough heat capacity to heat to a predetermined temperature a predetermined quantity of water in an interval from the opening of an outlet of the hot water supply system until at least the heat pump begins to heat water in the hot water supply system;
a heat exchanger coupled between the hot water supply system and the heat pump and arranged to exchange heat from liquid heated by the heat pump to heat water in the hot water supply system;
a processor to provide a signal to the heat pump based on the opening of the outlet of the hot water supply system;
an instantaneous water heater in the flow path to the outlet of the hot water supply system, the instantaneous water heater being controlled by the processor based on information about the status of the energy storage arrangement and of the heat pump; and
a temperature transducer in a flow path for water in the hot water supply system intermediate the heat exchanger and the instantaneous water heater;
wherein the processor is configured to sense the opening of the outlet of the hot water supply system and, based on a sensed hot water flow rate, determine a type of the outlet whose opening has been sensed, and, based on the sensed hot water flow rate, the determined type of the outlet whose opening has been sensed, the status of the energy storage arrangement and the status of the heat pump, determine whether to provide a start signal to the heat pump; and
wherein the processor is configured to rely preferentially on the energy storage arrangement and then the heat pump to provide sufficient hot water to the outlet of the hot water supply system.

2. The installation of claim 1, wherein the instantaneous water heater is an electric heater.

3. The installation of claim 1, wherein the processor is configured to activate the instantaneous water heater only when the energy storage arrangement and the heat pump are unable to provide sufficient hot water.

4. The installation of claim 1, wherein the processor is provided with logic to manage the use of the instantaneous water heater, the heat pump, and energy from the energy storage medium to reduce energy consumption.

5. A method of controlling a heat pump in an installation, wherein the installation comprises:
an in-building hot water supply system;
a heat pump arranged to heat water in the hot water supply system;
an energy storage arrangement containing a mass of energy storage medium having enough heat capacity to heat to a predetermined temperature a predetermined quantity of water in an interval from the opening of an outlet of the hot water supply system until at least until the heat pump begins to heat water in the hot water supply system;

a heat exchanger coupled between the hot water supply system and the heat pump and arranged to exchange heat from liquid heated by the heat pump to heat water in the hot water supply;

a processor, to provide a signal to the heat pump based on an opening of the outlet of the hot water supply system, wherein the processor is configured to receive information on the status of the energy storage arrangement and on the status of the heat pump;

an instantaneous water heater in a flow path to the outlet of the hot water supply system, the instantaneous water heater being controlled by the processor based on information about the status of the energy storage arrangement and of the heat pump; and a temperature transducer in a flow path for water in the hot water supply system intermediate the heat exchanger and the instantaneous water heater, wherein the processor is configured to control the instantaneous water heater, the processor being configured to rely preferentially on the energy storage arrangement and then the heat pump to provide sufficient hot water to the outlet of the hot water supply system;

the method comprising the processor:

sensing the opening of the outlet of the hot water supply system;

based on a sensed hot water flow rate, determining a type of the outlet whose opening has been sensed; and based on the sensed hot water flow rate, the determined type of the outlet whose opening has been sensed, the status of the energy storage arrangement, and the status of the heat pump, determining whether to provide a start signal to the heat pump.

6. The method of claim 5, further comprising the processor using predicted and/or scheduled demand data in determining whether to provide the start signal to the heat pump.

7. The method of claim 5, the method further comprising: the processor, in the event that it is determined not to provide a start signal to the heat pump, determining whether to energize the instantaneous water heater to heat water in the hot water system.

8. A non-transitory computer-readable storage medium comprising instructions which, when executed by a processor, cause the processor to carry out the method according to claim 5.

9. A processor and memory for use in controlling a heat pump in an installation, the installation comprising:

an in-building hot water supply system;

a heat pump arranged to heat water in the hot water supply system;

an energy storage arrangement containing a mass of energy storage medium having enough heat capacity to heat to a predetermined temperature a predetermined quantity of water in an interval from the opening of an outlet of the hot water supply system until at least until the heat pump begins to heat water in the hot water supply system;

a heat exchanger coupled between the hot water supply system and the heat pump and arranged to exchange heat from liquid heated by the heat pump to heat water in the hot water supply;

the processor being configured for operative connection to the heat pump to provide a signal to the heat pump based on the opening of the outlet of the hot water supply system, wherein the processor is configured to receive information on the status of the energy storage arrangement and on the status of the heat pump;

an instantaneous water heater in a flow path to the outlet of the hot water supply system, the instantaneous water heater being controlled by the processor based on information about the status of the energy storage arrangement and of the heat pump; and a temperature transducer in a flow path for water in the hot water supply system intermediate the heat exchanger and the instantaneous water heater, wherein the processor is configured to control the instantaneous water heater, the processor being configured to rely preferentially on the energy storage arrangement and then the heat pump to provide sufficient hot water to the outlet of the hot water supply system; and the memory, operatively coupled to the processor, storing instructions that cause the processor to perform a method of controlling the heat pump, the method comprising the processor:

sensing the opening of the outlet of the hot water supply system;

based on a sensed hot water flow rate, determining a type of the outlet whose opening has been sensed; and based on the sensed hot water flow rate, the determined type of the outlet whose opening has been sensed, the status of the energy storage arrangement, and the status of the heat pump, determining whether to provide a start signal to the heat pump.

10. The processor and memory of claim 9, wherein the processor, in the event that it is determined not to provide a start signal to the heat pump, is configured to determine whether to energize the instantaneous water heater to heat water in the hot water system.

* * * * *